US012761634B2

(12) United States Patent
Osterhaus et al.

(10) Patent No.: US 12,761,634 B2
(45) Date of Patent: Oct. 13, 2026

(54) BUSINESS AND MANUFACTURING SYSTEMS INTEGRATION NODE AND AUTOMATION DEVICE

(71) Applicant: QOC Innovations LLC, Fall River, WI (US)

(72) Inventors: Kari Osterhaus, Fall River, WI (US); Paul Osterhaus, Fall River, WI (US); Tristan Fullmer, Beaver Dam, WI (US); Jon Stenzel, Columbus, WI (US); Mike O'Neill, Seguin, TX (US); Jonathan Gunderson, Sun Prairie, WI (US)

(73) Assignee: QOC Innovations LLC, Fall River, WI (US)

( * ) Notice: Subject to any disclaimer, the term of this patent is extended or adjusted under 35 U.S.C. 154(b) by 305 days.

(21) Appl. No.: 18/634,550

(22) Filed: Apr. 12, 2024

(65) Prior Publication Data

US 2024/0353821 A1 Oct. 24, 2024

Related U.S. Application Data

(60) Provisional application No. 63/495,669, filed on Apr. 12, 2023.

(51) Int. Cl.
*G05B 19/418* (2006.01)
*G06Q 10/087* (2023.01)

(52) U.S. Cl.
CPC ... *G05B 19/4185* (2013.01); *G05B 19/41865* (2013.01); *G06Q 10/087* (2013.01)

(58) Field of Classification Search
CPC ............ G05B 19/41865; G05B 19/418; G05B 19/4185; G05B 19/41845; G06Q 10/087; G06Q 10/0877
See application file for complete search history.

(56) References Cited

U.S. PATENT DOCUMENTS

| | | | | |
|---|---|---|---|---|
| 2005/0267882 | A1* | 12/2005 | Aupperlee | G05B 19/4186 |
| 2008/0221721 | A1* | 9/2008 | Reed | C23C 14/3414 700/109 |
| 2017/0357249 | A1* | 12/2017 | Sandler | G06Q 10/00 |
| 2019/0379725 | A1* | 12/2019 | Wada | H04L 67/12 |
| 2022/0108249 | A1* | 4/2022 | Maheshwari | G06Q 10/0633 |

* cited by examiner

*Primary Examiner* — Mong-Shune Chung
(74) *Attorney, Agent, or Firm* — Godfrey & Kahn, S.C.; Christopher M. Scherer; Erin Ella Block

(57) ABSTRACT

In an embodiment, the Node Device, is a modular device that can integrate with any number of ERP and/or other business systems to receive system data from the ERP system and send update data from the Node Device to the ERP system. Optionally the Node Device can be installed at one of any number of workstations at a facility to provide automation instructions to connected automated devices. Through integrating with the ERP system and the automated devices at the workstation, the automation instructions are generated on the Node Device and then implemented through the Node Device when tasks or series of tasks are performed at the workstation. In an embodiment, the Node Device is equipped to physically connect to equipment and devices at the workstation and to wirelessly connect to equipment and devices at the workstation dependent on the requirements of the equipment and devices.

20 Claims, 15 Drawing Sheets

BUSINESS AND MANUFACTURING SYSTEMS INTEGRATION NODE AND AUTOMATION DEVICE

CROSS-REFERENCE PARAGRAPH

This application claims priority to U.S. Provisional Application No. 63/495,669 filed Apr. 12, 2023, the contents of which are incorporated herein by reference in their entirety.

FIELD

The present disclosure is directed to a computer device, and more specifically a computer device for integrating business and manufacturing systems, automating completion of manufacturing jobs, and automating updates to business and manufacturing systems.

BACKGROUND OF THE INVENTION

Businesses and manufacturing facilities have many moving parts, sales, inventory, production, receiving, shipping, accounting, document repositories, planning, personnel, manufacturing, etc. Businesses and manufacturing facilities need a way to document, track, and coordinate all of the moving parts. Enterprise Resource Planning (ERP) systems and other computerized business organizational systems (hereinafter collectively "ERP systems") are a common option for replacing manual documentation and tracking systems which typically include implementation goals such as reducing errors and increasing efficiency and profits. However, ERP systems and other business organizational systems are front-office systems and are not able to communicate directly with facility locations, workstations, or remote locations (collectively "workstations") to deliver job and manufacturing information or receive updates from the workstations. Therefore, while ERP systems help organize business and manufacturing facilities, they still require additional communication methods between the ERP system and workstations to receive and deliver critical information to the ERP system and provide critical information to workstations. Further, because ERP systems cannot communicate directly with workstations, they cannot be automated by workstations and also cannot directly aid in facilitating the workstation's automation of jobs. Examples of workstation location types and data transferred follow in Table 1.

TABLE 1

Examples of Business Remote Locations Connected to ERP Systems and information received and delivered

| Location | Data Received from ERP system | Data Delivered to ERP system |
|---|---|---|
| Receiving | Expected deliveries of ingredients and materials | Delivery receipt confirmation<br>Location of storage location |
| Quality station | Notification of deliveries<br>Work in progress or completed | Results of quality checks<br>Approval to advance WIP to the next station |
| Work center | Available jobs<br>Information for each job<br>Available inventory<br>Serial Tracking | Job start and completion<br>Inventory picking<br>Quantities of items completed<br>Location of storage |
| Shipping | Available orders to fill<br>Available inventory to ship<br>Shipping contacts/methods | Shipping confirmation<br>Shipping documents |

The procedure for coordinating communications between ERP systems and workstations (e.g., delivery of job information to workstations, receipt of job update or other update information from the workstations at the ERP system) have traditionally been solved with manual delivery of communications (either handwritten or electronic) or the installation of computers, such as laptops or desktops, at each workstation connected to the ERP system, each of which have their drawbacks.

Having a laptop or desktop computer at each workstation fulfills a need for efficient and accurate communication. However, computers are usually expensive and often require a relatively large volume of physical space. They are frequently not physically suitable for the intended location and relatively fragile. Further, modern computers are typically overpowered compared to what is required for the simple communication tasks and automation tasks at the remote workstation.

The electronic method (typically a spreadsheet or database program) requires some computer-like device at the workstation (a computer without an ERP seat license or perhaps a tablet device) but requires manual data entry at the ERP system and often at the workstation. Both instances of manual entry provides opportunities for data entering errors. This system, like the computer option, can electronically submit the information to some other location nearly in real time, even to a different site, but typically does not have the integration capabilities to communicate directly to the ERP system.

Finally, handwritten data collection and delivery to somewhere for entry into the ERP system or delivery from the ERP system to the remote workstation requires physically moving the information, which can take precious time, and is subject to errors on both ends of the collection and entry exchange. However, businesses can implement this system quickly and execute it cheaply and it remains common, especially in smaller operations that often cannot afford the expenses of the other options.

Further, the above solutions for communication between the ERP system and the workstation does not allow integration of the ERP system with resources at the workstation to facilitate automation of processes performed at the workstation or allow resources at the workstation to report process performed to the ERP system.

Typically, controlling resources at a workstation (i.e. the equipment in the (manufacturing, process, etc.) system) would be accomplished manually or with a computer device at the workstation, or remote site that is connected to the resources at the workstation and specially programmed to automate the workstation. However, the programming of the computer typically requires highly trained personnel to program the interactions between the computer and the expensive automated equipment, along with extensive periods of fabrication, planning, programming, testing and on-site tuning. These activities often require expansive budgets to complete. Further, the computer at the workstation needs to be equipped with special ports that allow the resources at the workstation to connect directly to the computer, which a traditional laptop or desktop is not typically equipped with. Further, these automation systems are traditionally not capable of interacting and communicating directly with the ERP system. Accordingly, a business or manufacturing facility/company with an ERP system and automated/semi-automated workstations requires two separate communication systems, a communication system for automating the equipment at the workstation, a communication system for communicating between the workstation and the ERP system, and a method for transferring information between the two communication systems.

BRIEF SUMMARY

There is an unmet need in the industry for a single device capable of being changeably installed at a workstation that can both communicate directly with an ERP system and automate the equipment at the workstation allowing the ERP system to facilitate job automation and allowing the equipment at the workstation to provide automated updates to the ERP system all in real-time. There is further an unmet need in the industry for the single device to be low-powered, durable, low-profile, and cost-effective device that can quickly be fabricated, and configurable to workstations throughout a facility. It should be understood that any reference to "throughout a facility" includes, but is not limited to, locations at a single facility, multiple facilities within the company, and/or remote locations within the company. Such a device would minimize errors by directly reporting updates from the connected automated workstation equipment to the workstation to the ERP system and maximize efficiency by directly providing work orders and updates to the workstation and automating the workstation equipment in real-time.

Further, there is an unmet need in the industry for an automation device that can be changeably installed at workstations throughout a facility that allows the company to adaptively and intuitively develop and deliver automation instructions to resources and equipment at the workstation and receive sensor and critical update information and signals at the workstation from the resources and equipment at the workstation. Such a device would increase production efficiency and minimize the time required and expense of custom fabrication and automation. Such a device would further allow for the adaptability of a workstation, providing the ability to easily add and remove equipment/resources from a workstation and modify the processes and workorders at a workstation without the need for expensive custom automation and programming to change the automation instructions.

Further, there is an unmet need in the industry for a single device that can communicate directly with a company's ERP system and automate resources and equipment at the workstation, serving as a bridge between the ERP system and the resources/equipment at the workstation. This allows for automation based on workorders and information received directly from the ERP system and allows for the resources and equipment to provide direct updates to the ERP system in real-time as production is completed. This eliminates human error in conveying information to and from the ERP system, increases efficiency in the delivery and update of workorders, increases efficiency and repeatability in the performance and completion of production, and provides the company with real-time status and updates on workorders through the ERP system.

The embodiments described or otherwise contemplated herein substantially meet the aforementioned needs of the industry. In an embodiment, the ERP system integration node and automation device (hereinafter the "Node Device"), is a modular device in that can be installed at one of any number of workstations throughout a facility and can integrate with any number of ERP and/or other business systems simply by selecting the appropriate ERP/business system and by selecting the workstation identification from the plurality of workstation identifications provided by the ERP system. In an embodiment, the Node Device may be less modular and only be able to integrate with a specific ERP and/or business system and/or only be adapted for use at a specific workstation at the facility. Each of the above embodiments allows the Node Device to integrate with the ERP system and the workstation resources quickly, inexpensively, and reliably.

In embodiments, any person with knowledge of the tasks to be performed and completed at a workstation and knowledge of the processes, inventory, and equipment used for performing and completing tasks at workstations can create automation instructions for workstation equipment and automation orders for the workstation. In embodiments, the automation orders may be stored directly on the Node Device. In embodiments, the automation orders may be stored remote from the node device (e.g., on the cloud or at a remotely networked computer station, etc.) and wirelessly transferred to the node device. The person developing the automation instructions requires no special programming skills or abilities, the only requirement is knowledge of the equipment processes and tasks to be completed at the workstation(s).

When the Node Device is installed at a workstation the devices and equipment at the workstation are connected to the node device (devices/equipment can be either wired or wirelessly connected) and automates the devices and equipment at the workstation based on the information provided by the ERP system (e.g., workorders to be completed) to the Node Device and the automation instructions on the Node Device for the workstation. In an embodiment, the Node Device is equipped to physically connect (i.e. wired) to equipment and devices at the workstation and to wirelessly connect to equipment and devices at the workstation based on the requirements of the equipment and devices.

In embodiments, the Node Device is a completely self-contained computerized device in a 3-D printed case that is equipped with a touchscreen, pins (for equipment/devices at the workstation), A/C adaptor, optional battery pack (for mobility and/or battery backup), power switch, ports (for equipment at the workstation), optional wireless capabilities (for equipment at the workstation, for connecting to ERP system, and for receiving updates and automation instructions, etc.), and optional network capabilities. The 3-D printed case for containing the computerized components of the Node Device is capable of being mounted to most any surface in a manufacturing facility including a wall, the side of a break press, transport carts, table-top desks, CNC mills, etc. This enables the installation of the Node Device at a workstation in a permanent, semi-permanent, or even mobile fashion. In an embodiment, other than the programming used to operate the Node Device, the automation instructions, and the programming used to integrate with the ERP system, the Node Device does not store or maintain any additional information or data. To this end, the Node Device is developed to minimize onboard hardware, memory, power consumption and size. This makes the Node Device significantly more economical, durable, and installable than traditional alternative options. The 3-D printed case allows for the precise customized enclosure of all hardware equipment for the Node Device in a protected and durable fashion suitable for manufacturing and production workstations. Further the use of minimal onboard hardware and readily available components and the modularity of the Node Device allows for nearly on-demand delivery and implementation of the Node Device at a facility or workstation (generally a matter of days from order to installation). This is unlike other ERP integration options and/or automation integration options (as discussed above), which typically require multiple months to assemble, plan, build, test, and implement for a specific workstation.

A device or a device and a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

In one general aspect, according to certain embodiments a method is disclosed that includes installing a node device at a workstation, receiving an ERP identification at the node device for an ERP system, analyzing, by the node device, the ERP identification to load a corresponding ERP communication driver, receiving a workstation identification at the node device for a workstation, receiving work data information and inventory location data at the node device from the ERP system, generating, by the node device, node work information and node component location data using the ERP communication driver, receiving one or more external automated device identifications at the node device for one or more external automated devices connect to the node device, generating a node automation identification data using a device communication driver for each one or more external automated device identifications based on a corresponding received external automated device identification, generating, by the node device, automation instructions based on the node work information, node component location data, and node automation identification data, storing the automation instructions on the node device, and dynamically updating, by the node device, automation instructions based on new node work information, node component location data, or node automation identification data.

In one general aspect, according to certain embodiments a method is disclosed that includes initializing a node device previously installed at a workstation, loading a previously identified ERP communication driver into a node device memory, receiving, by the node device, a workstation identification for a workstation, loading one or more automation instructions based on the workstation identification into the node device memory, receiving, by the node device, available job data from the ERP system based on the workstation identification, generating, by the node device, an available node job for each available job data based on a corresponding availably job data using the ERP communication driver, identifying, by the node device, one available node job to execute by the node device, receiving, by the node device, one or more job information data from the ERP system for the identified one available node job, generating, by the node device, a node job data for each job information data based on a corresponding job information data using the ERP communication driver, executing, by the node device, each node job data based on the automation instructions, wherein the executing includes: providing, by the node device, automation instructions to one or more external automated devices, providing, by the node device, one or more ERP inventory updates, job information updates, or ERP information updates to the ERP system based on the automation instructions, processing, by the node device, input signal data received from the one or more external automated devices based on the automation instructions, and generating, by the node device, the one or more ERP inventory updates, job information updates, or ERP information updates based on the processed input signal data and the automation instructions, determining, by the node device, that each job information data for the identified available node job is complete, and reporting, by the node device, to the ERP system that the available job data is completed.

In one general aspect, according to certain embodiments a node device is disclosed for integrating with external systems and externally connected devices and automating the external systems and the externally connected devices, comprising: a memory comprising computer readable instructions; input and output mechanisms operably coupling the node device to an external ERP system and one or more externally connected devices; an internal storage; and a processor configured to read the computer readable instructions that when executed causes the system to execute the above described methods.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The objects and advantages will appear more fully from the following detailed description made in conjunction with the accompanying drawings.

BRIEF DESCRIPTION OF THE DRAWING(S)

Figure 1A:
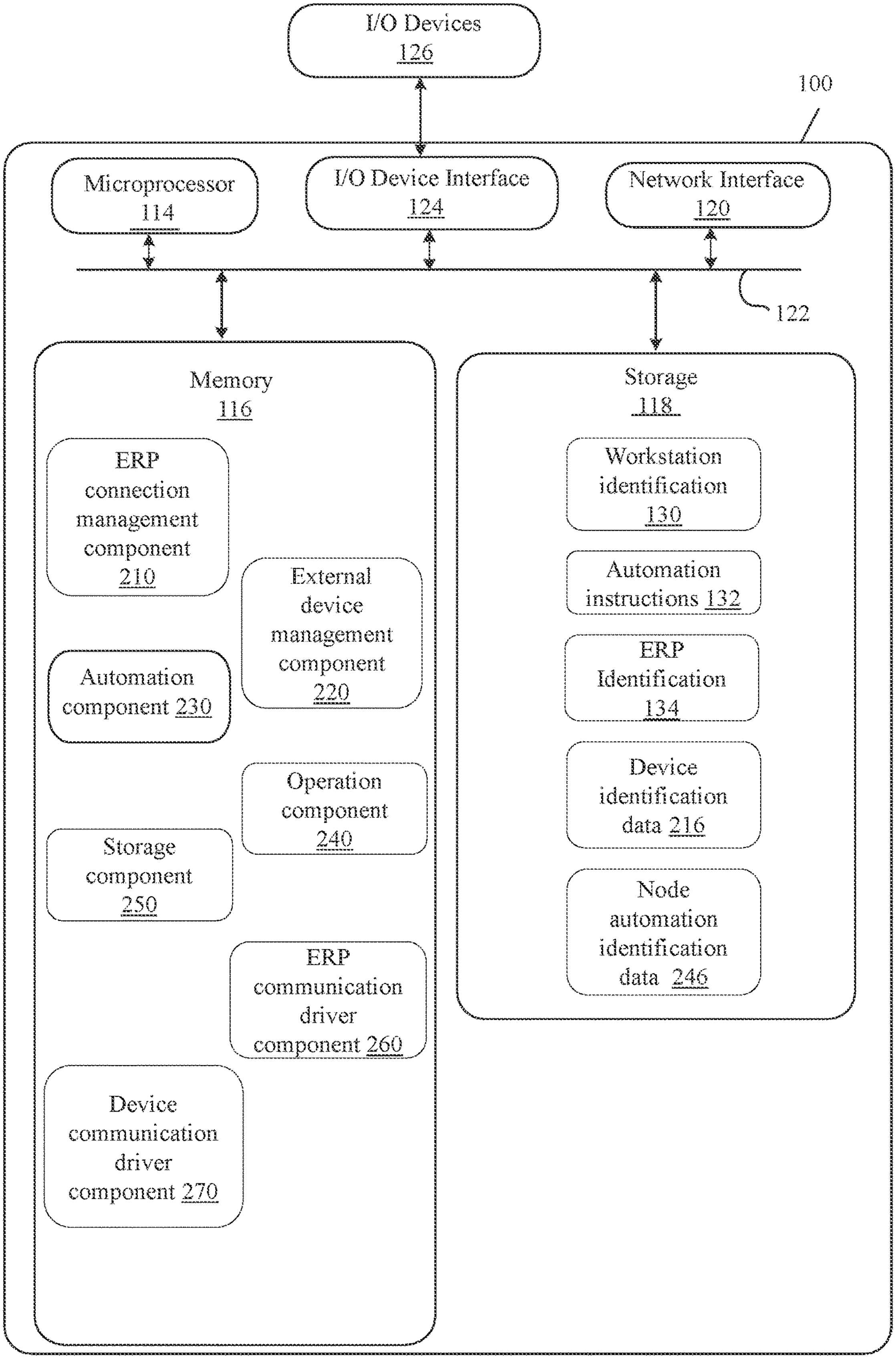
FIG. 1A depicts an example embodiment of a Node computing Device according to certain embodiments.
Figure 1B:
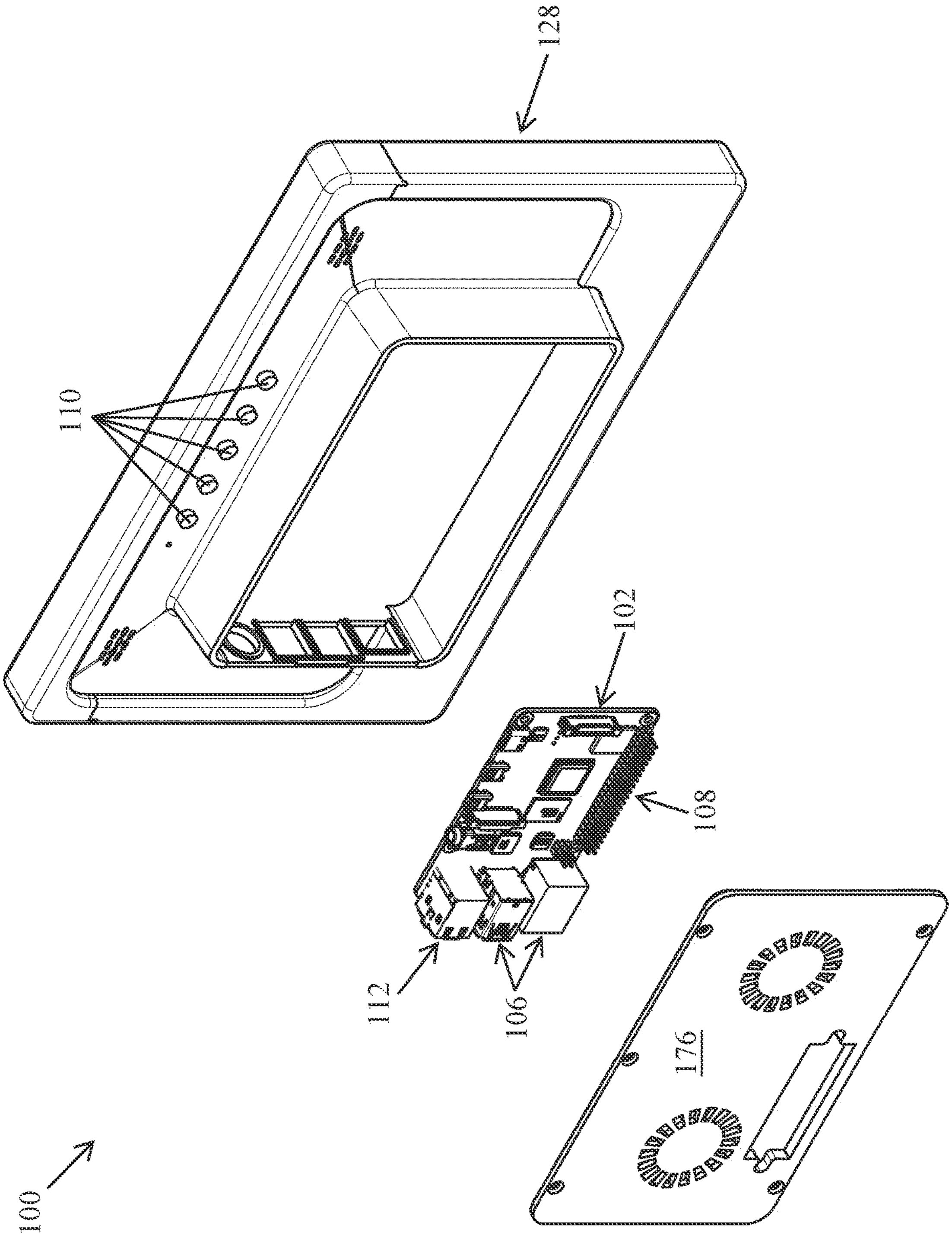
FIGS. 1B and 1C depict example embodiments of a Node Device with a single-board computer, according to certain embodiments.
Figure 1C:
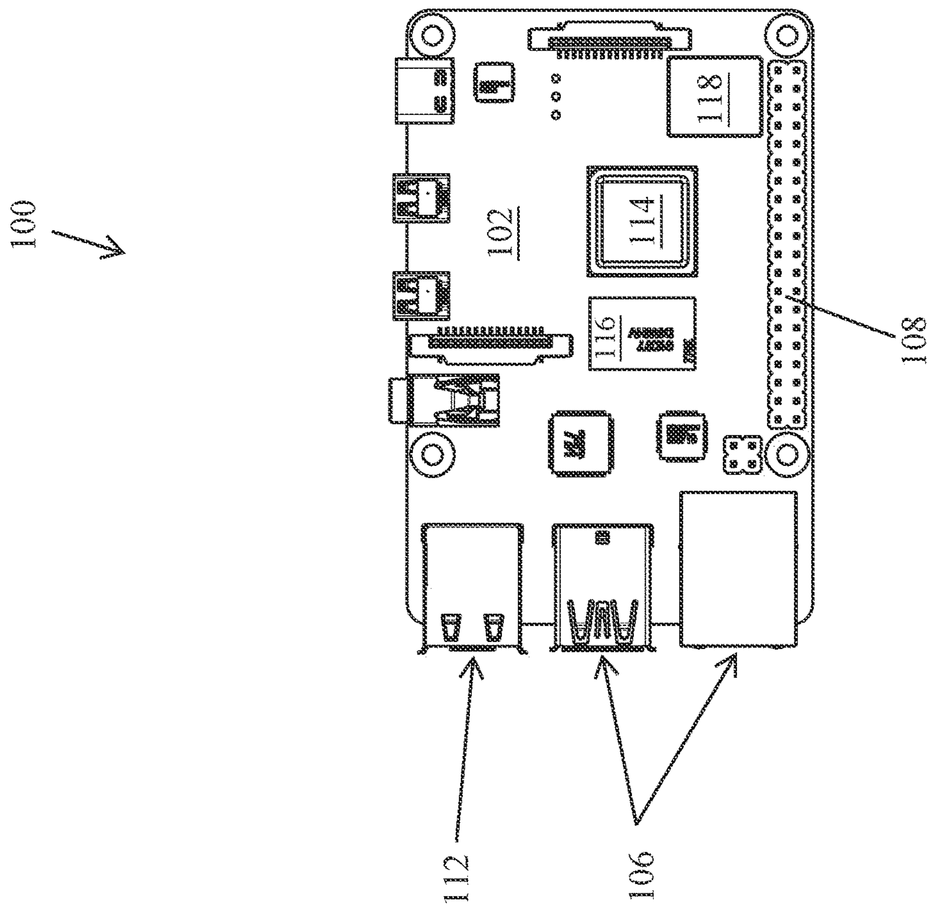
Figure 1D:
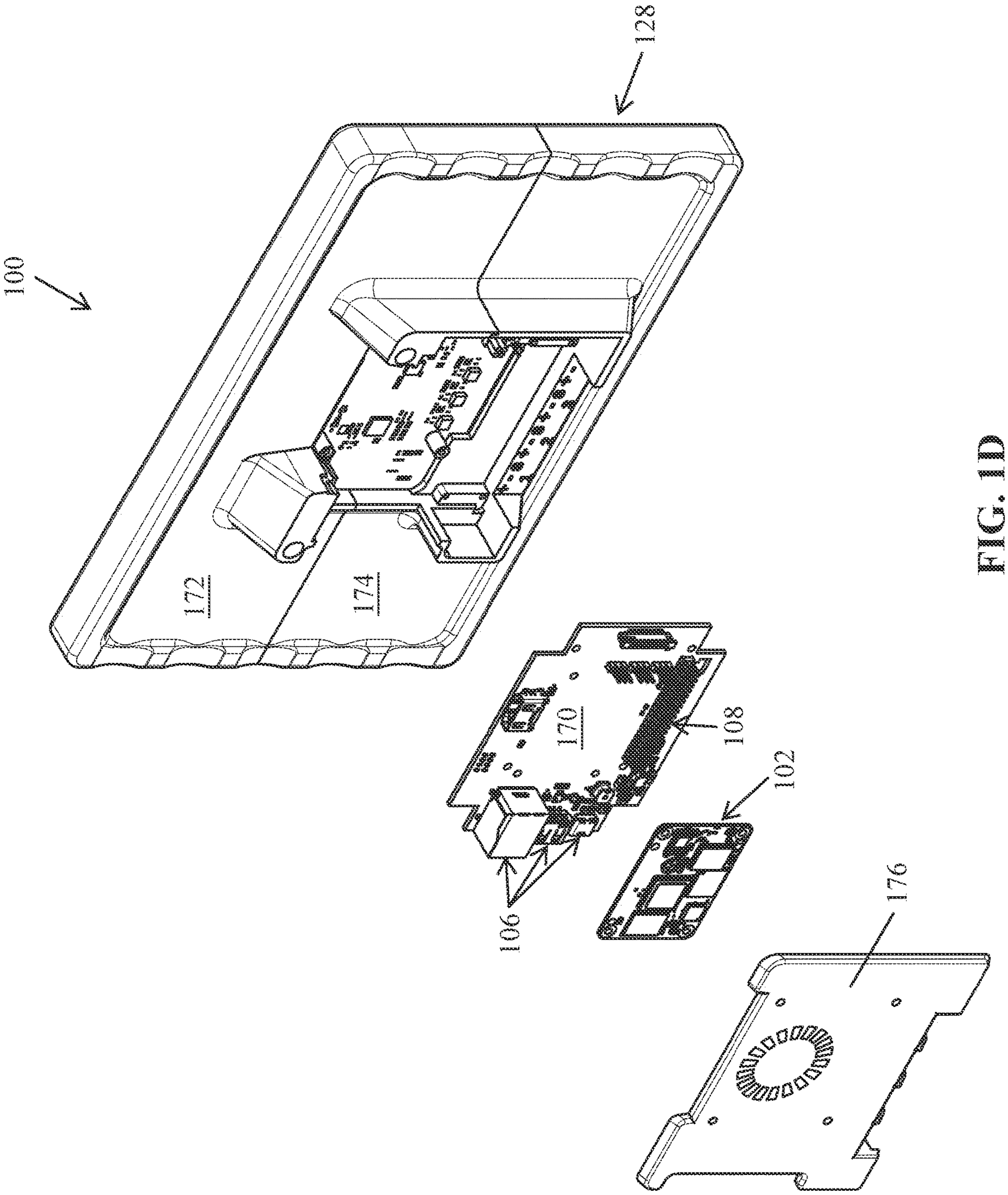
Figure 1E:
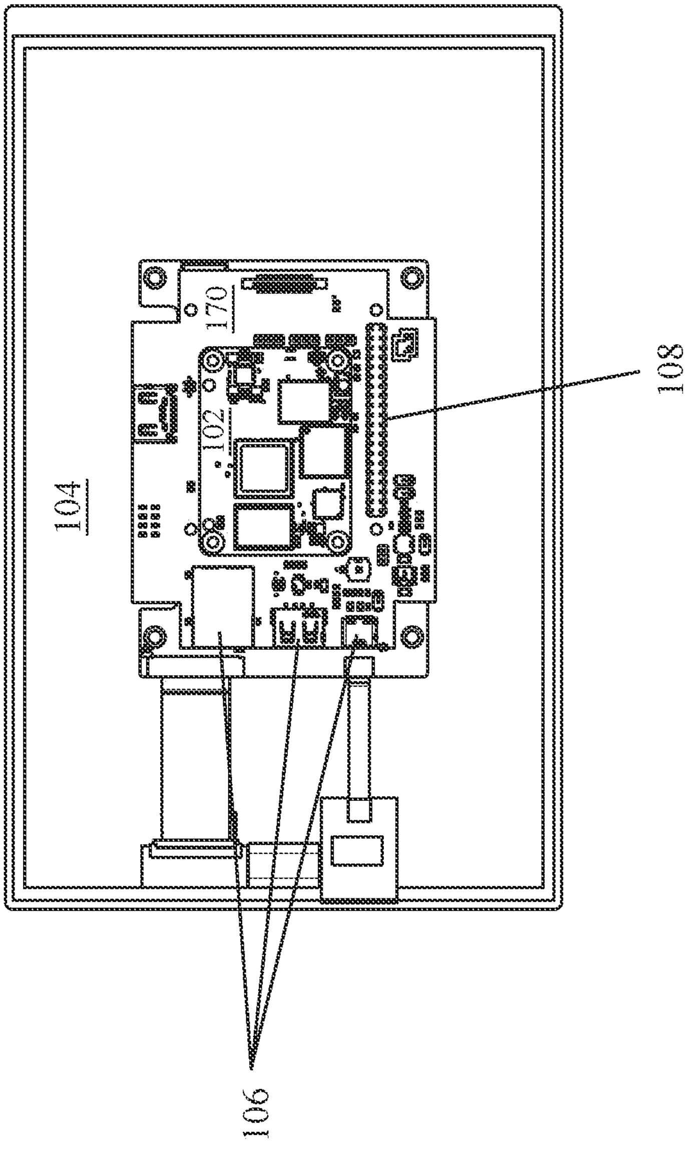
Figure 1F:
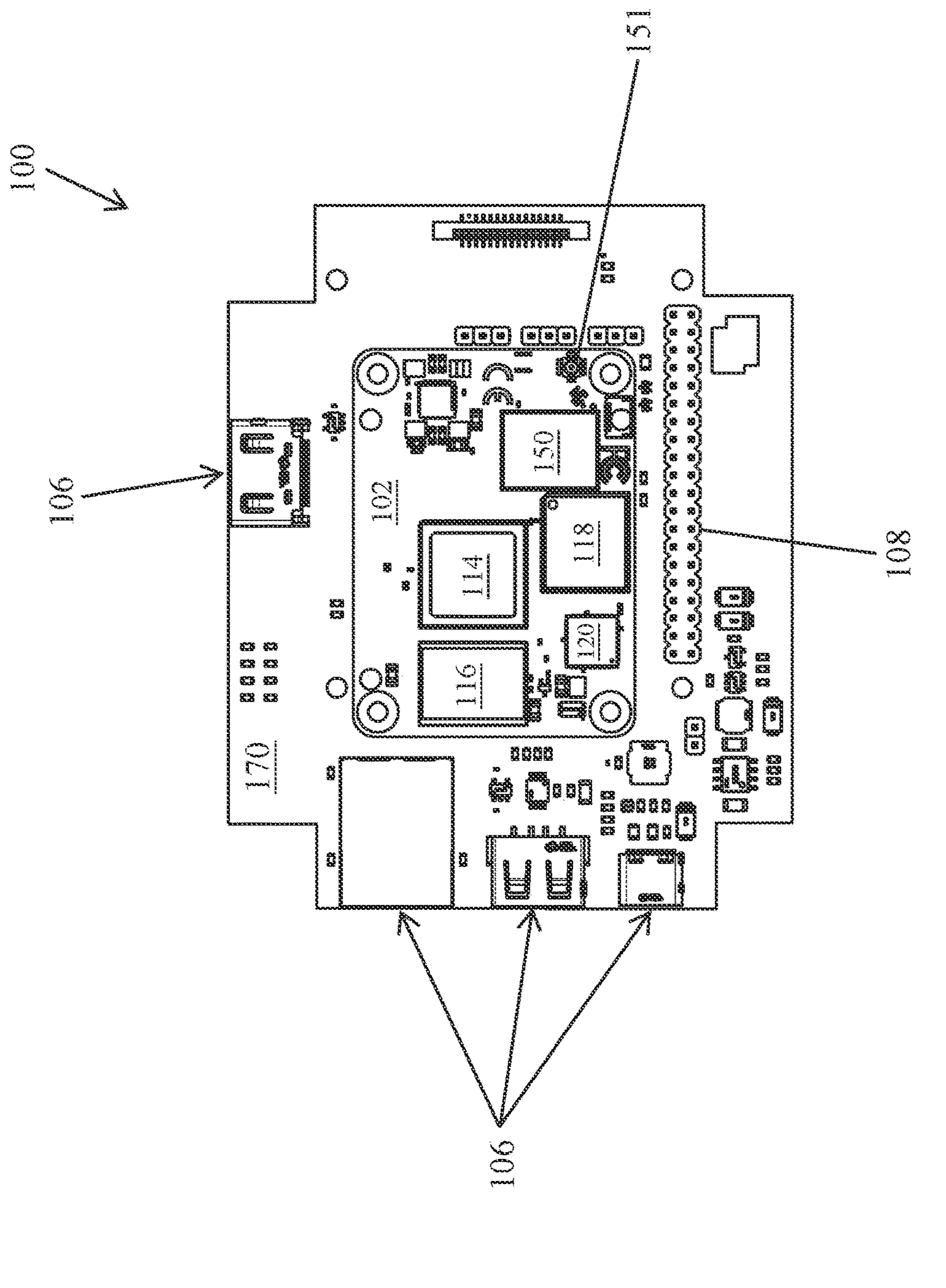
Figure 1G:
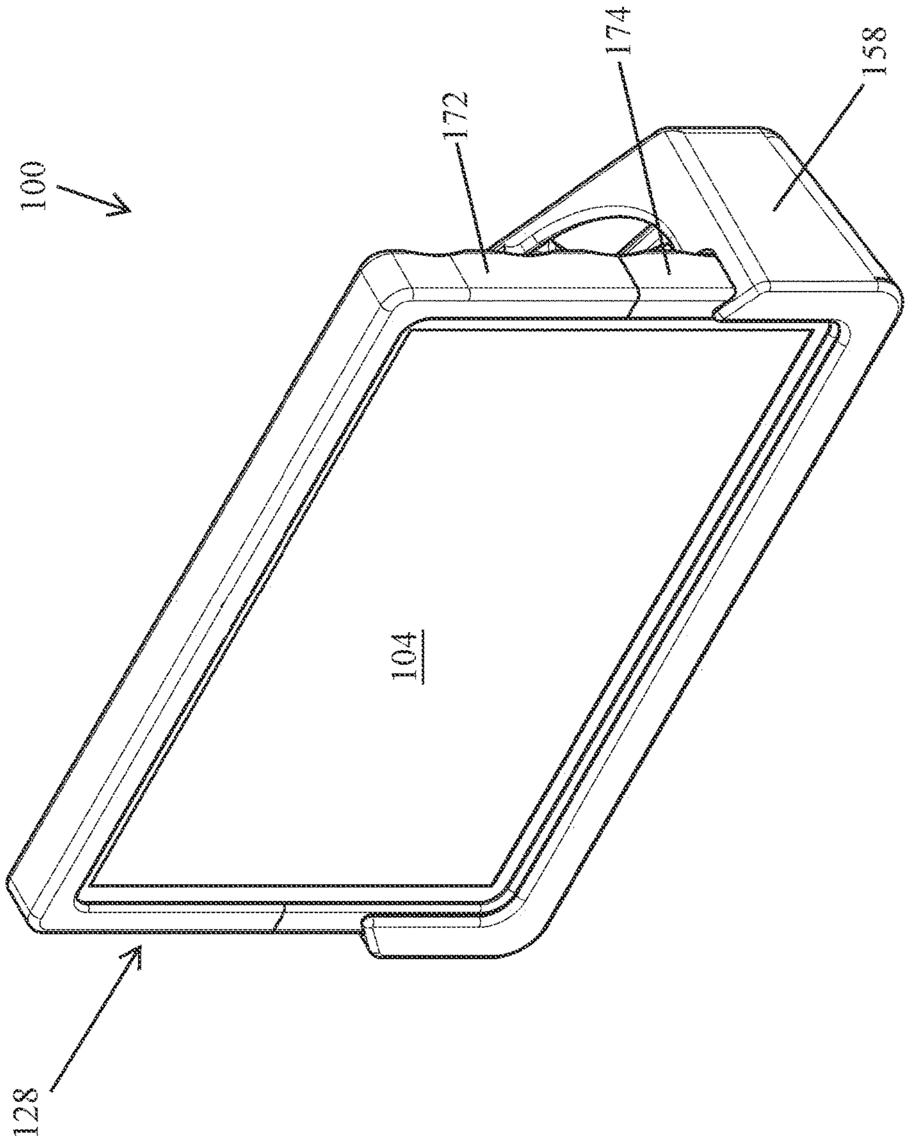
Figure 1H:
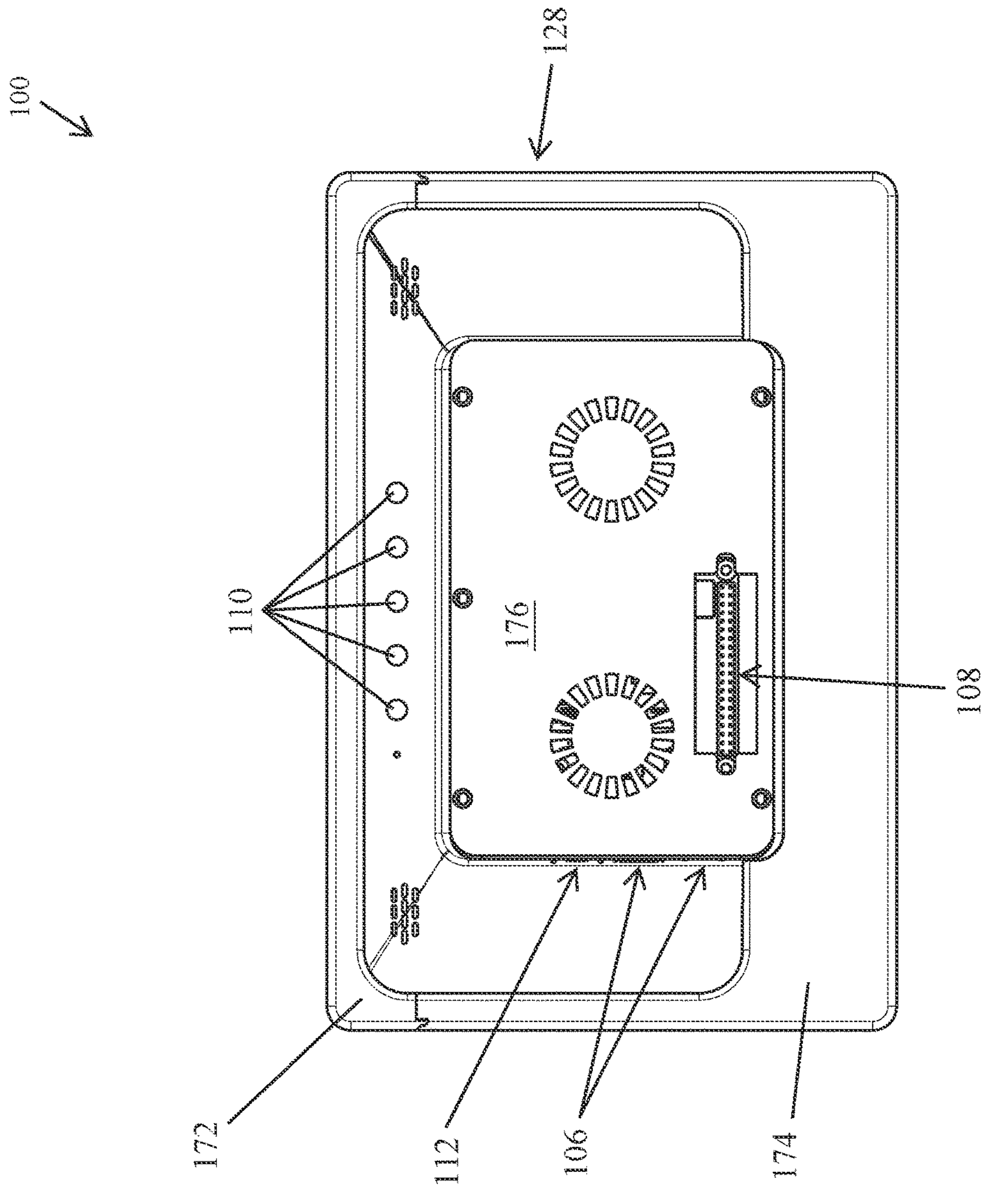
Figure 1I:
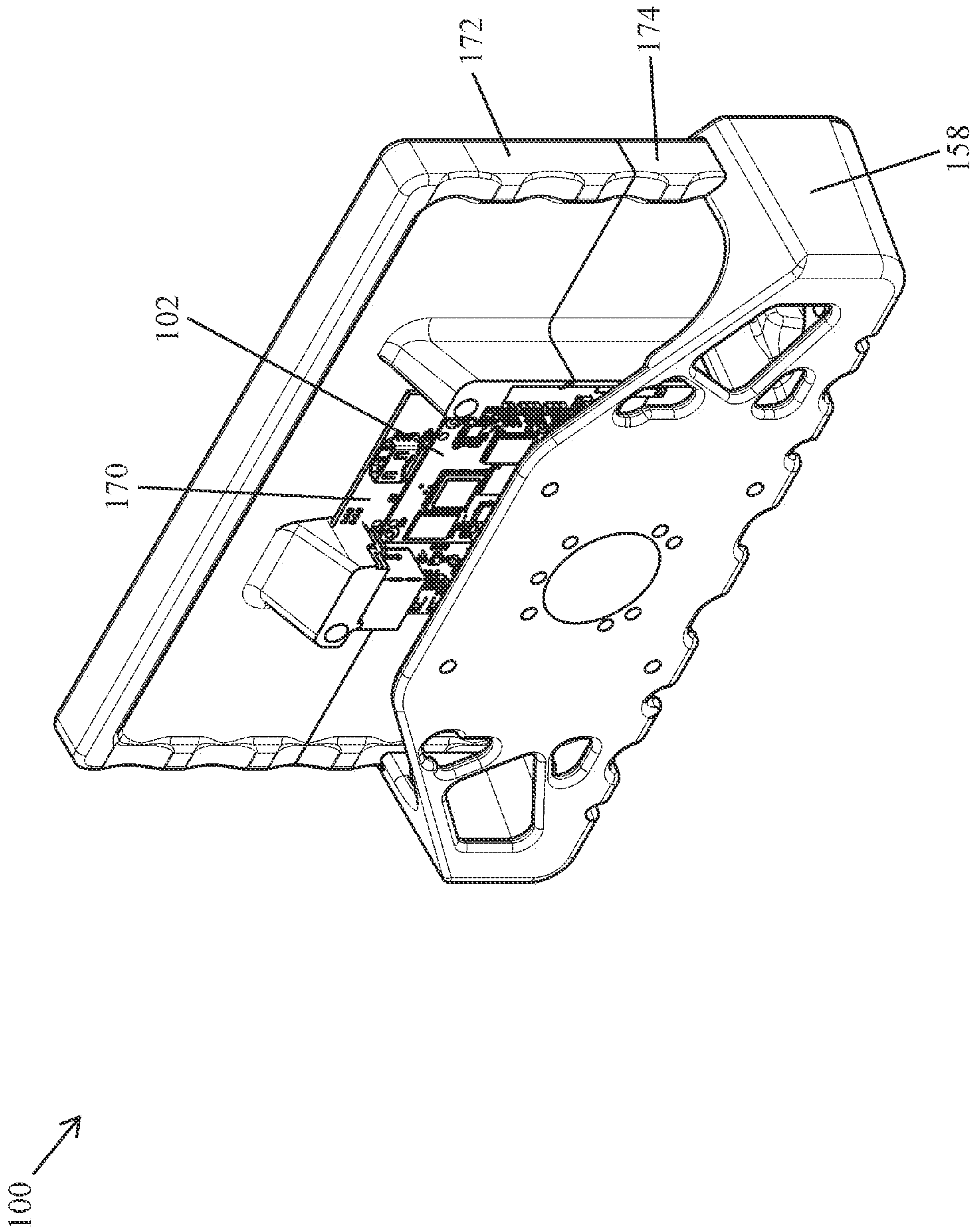
Figure 1J:
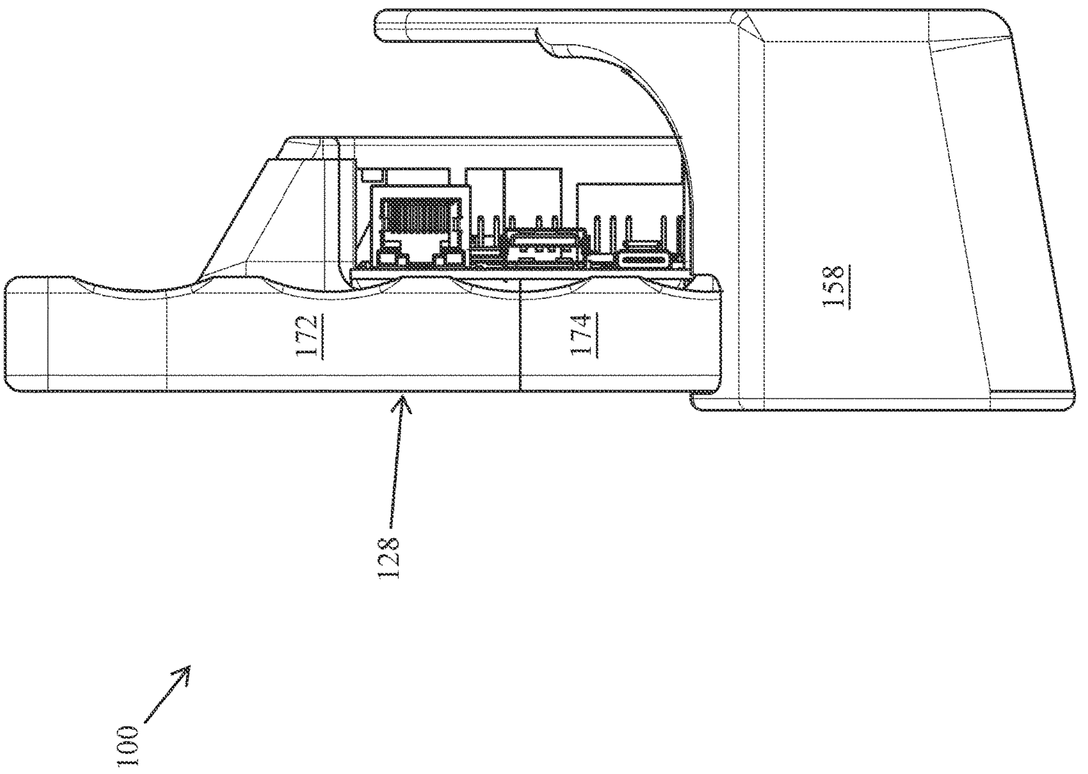

FIGS. 1D, 1E, and 1F depict example embodiments of a Node Device with a single-board computer and carrier board, according to certain embodiments.

FIGS. 1G, 1H, 1I, and 1J depict example external embodiments of a Node Device, according to certain embodiments.

Figure 2A:
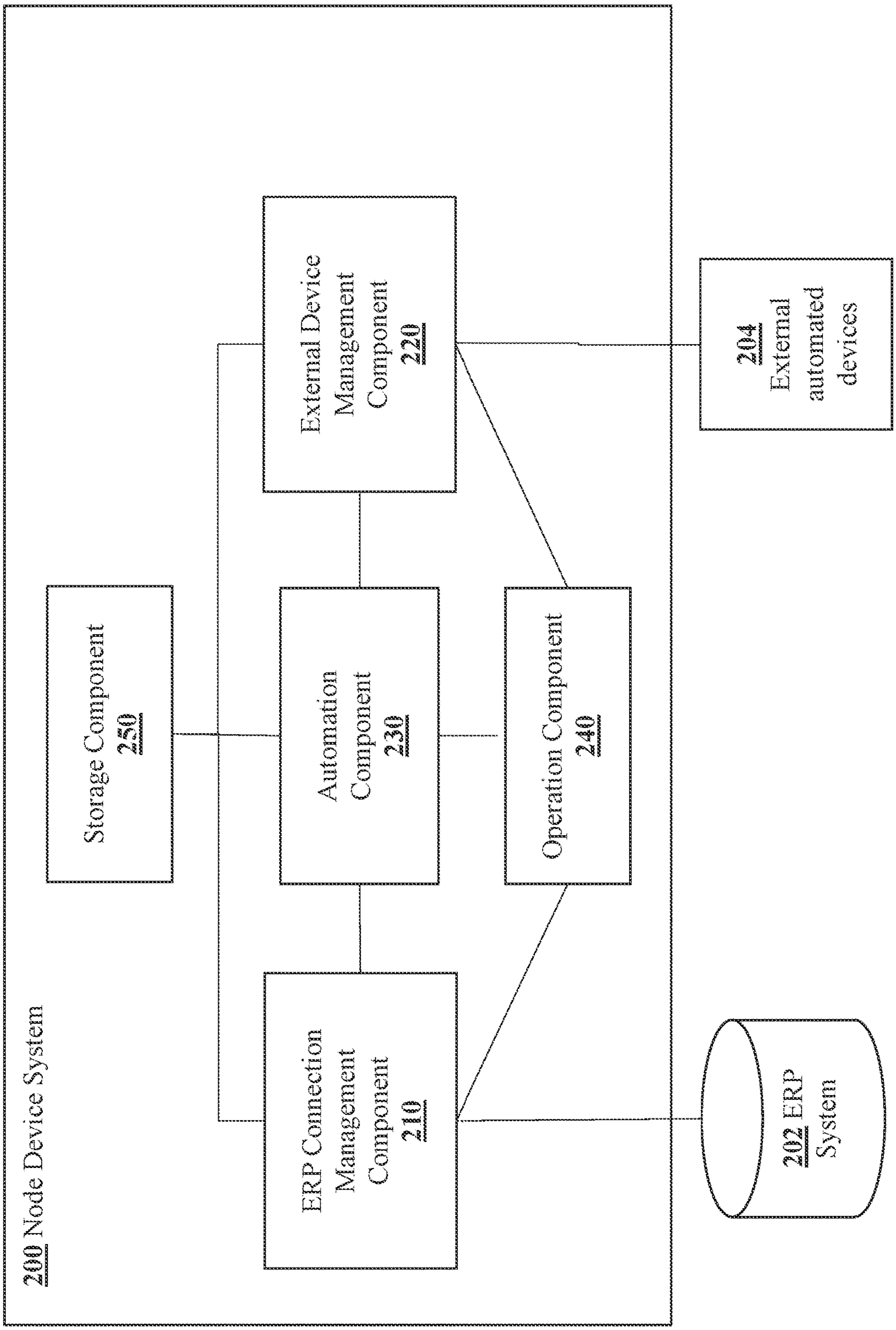
Figure 2B:
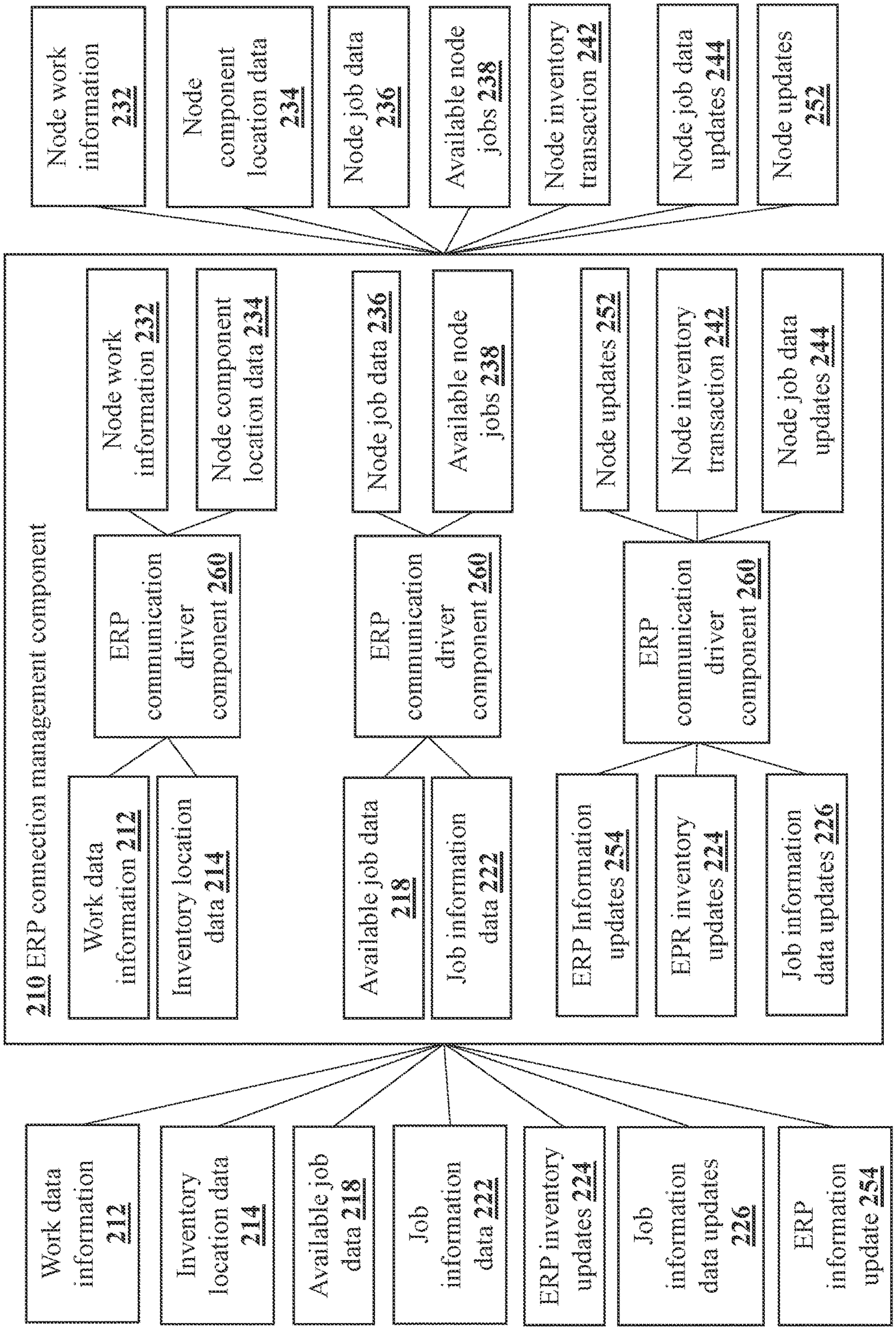
Figure 2C:
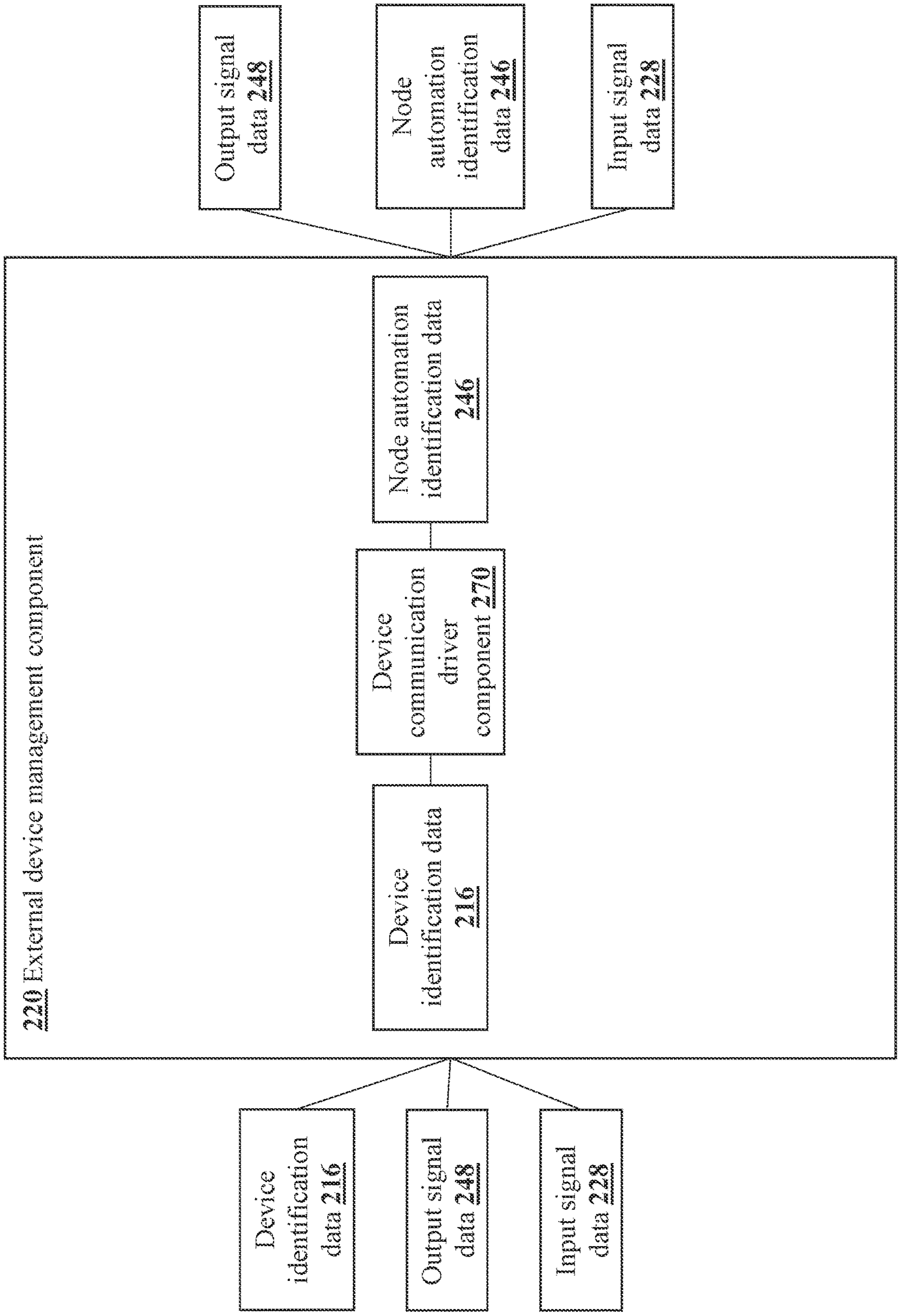

FIGS. 2A, 2B, and 2C depict an example embodiment of a Node Device system implemented on the Node Device according to certain embodiments.

Figure 3:
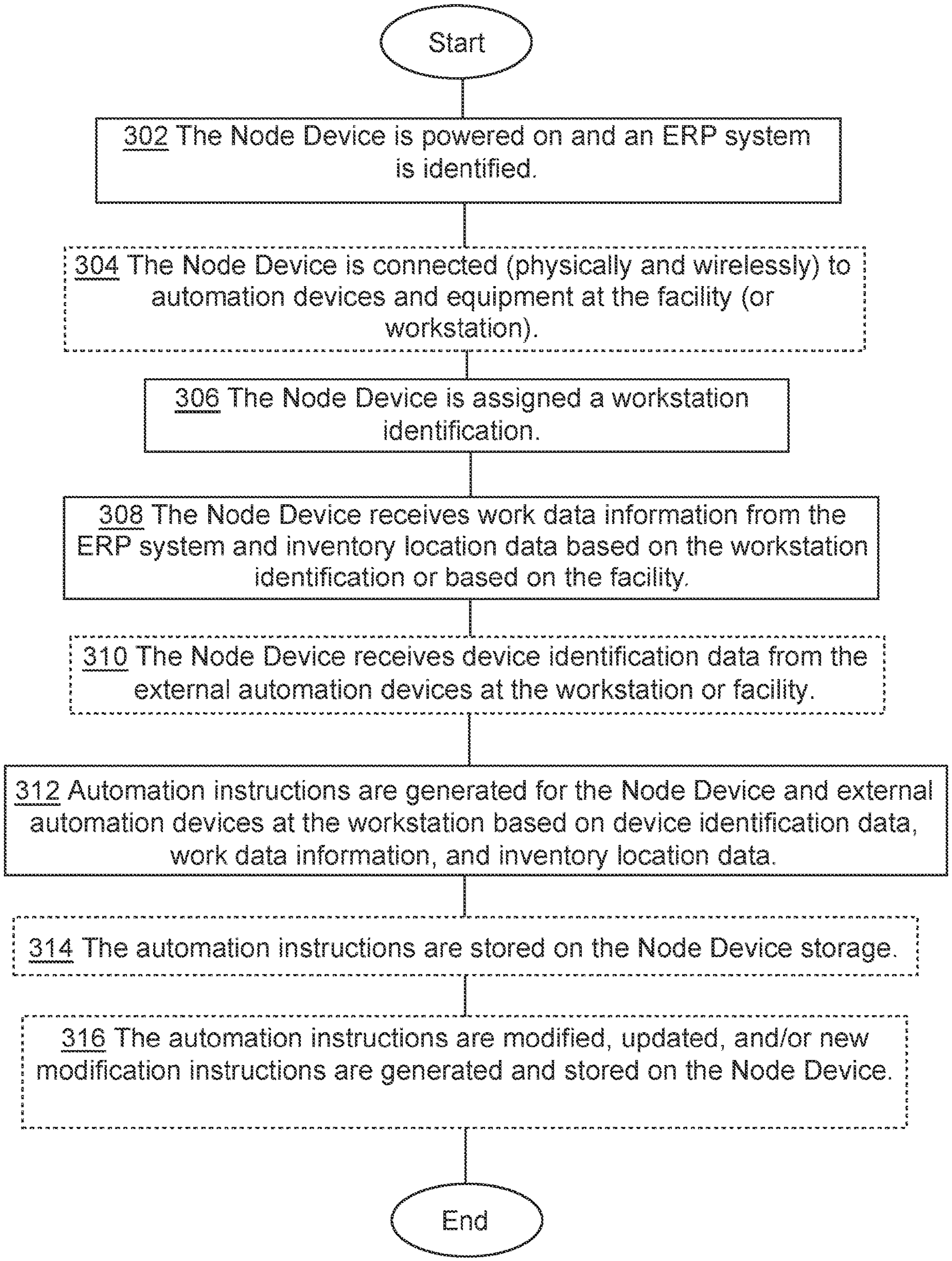

FIG. 3 depicts a flowchart of an example of a method for integrating a Node Device at a workstation with an ERP system and with automated devices at the workstation, and generating automated instructions for the workstation, according to certain embodiments.

Figure 4:
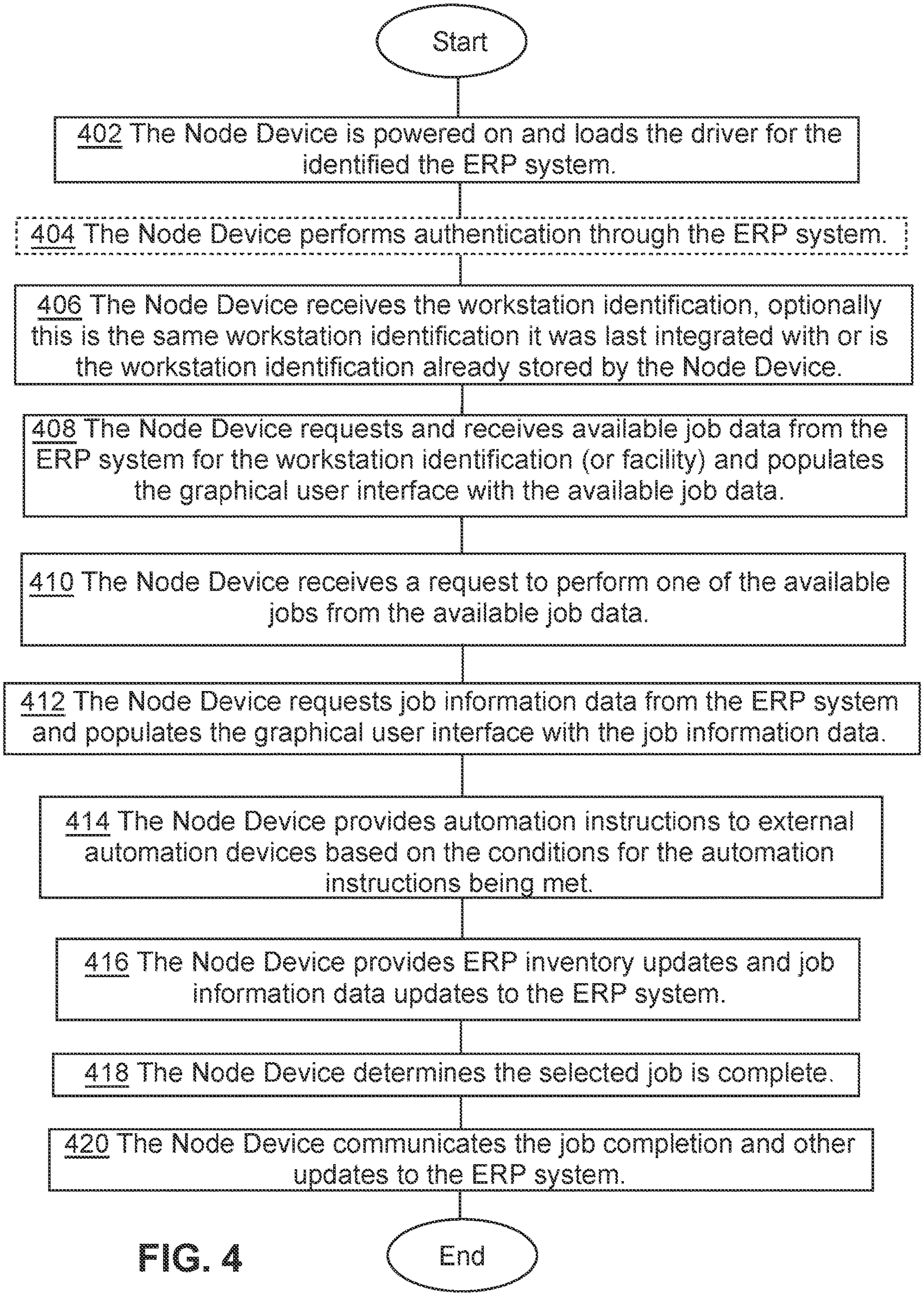

FIG. 4 depicts a flowchart of an example of a method for operating an integrated Node Device at a workstation, according to certain embodiments.

It should be understood that for clarity, not every part is necessarily labeled in every drawing. Lack of labeling should not be interpreted as a lack of disclosure.

DETAILED DESCRIPTION OF THE INVENTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

FIG. 1A depicts an example embodiment of a system for an ERP system integration node and automation device (hereinafter a "Node Device") 100. FIGS. 1B, 1C, 1D, 1E, 1F, 1G, 1H, 1I, and 1J depict example embodiments of the Node Device 100. In an embodiment, the Node Device is a modular self-contained, specialized computer device configured to directly integrate with and communicate (wired or wirelessly) with an ERP system and directly integrate with and communicate (wired or wirelessly) with automatable devices and equipment at a workstation (i.e. a location in a facility or business including remote locations of the company). The Node Device may be installed at one of any number of workstations and integrate with any number of different ERP and/or other business systems simply by selecting the appropriate ERP/business system and selecting the workstation identification from the plurality of workstation identifications provided by the ERP system. In an embodiment, the Node Device may automatedly identify the appropriate ERP system and workstation identification upon installation at the workstation. Alternately, in an embodiment, the Node Device may be integrated with just the ERP system and will then essentially be integrated with all workstations in that all job information will be available to the Node Device. In an embodiment, the Node Device does not integrate with an ERP system, but rather only integrates with external automated devices. In an embodiment, the Node Device may be less modular and only be able to integrate with a specific ERP and/or business system and/or only be adapted for use at a specific workstation at the facility. In this embodiment selection of the ERP system and/or workstation identification would not be needed as they would be predetermined. Each of the above embodiments allows the Node Device to integrate with the ERP system and the workstation quickly, inexpensively, and reliably.

Referring to FIGS. 1A, 1B, 1C, 1D, 1E, 1F, 1G, 1H, 1I, and 1J, in embodiments, the Node Device comprises all hardware, firmware, software, data stores, and interfaces used to integrate with and communicate with an ERP system and integrate with and communicate with automatable devices and equipment at a location in a facility or business (including remote locations) for automating jobs and tasks at a workstation. In an embodiment, the Node Device includes a single-board computer 102, a display screen 104 with appropriate controller board, a variety of ports 106 for connecting to and communicating with external devices, a terminal block/pins 108 for controlling wired external devices and equipment, optional audio controls 110, and optional power controls 112 (described in greater detail below). The Node Device may include additional hardware such as LEDs, fans, heatsinks, additional switch buttons to control different power aspects of the Node Device (e.g., a switch for touch panel power), etc. (not pictured). In an embodiment, the Node Device also includes a carrier board 170 attached to the single-board computer 102 and that the peripheral components (ports 106, terminal block 108, etc.) are connected to the carrier board 170, rather than directly to the single-board computer 102. It should be understood that the above components may be connected in different positions on the Node Device than depicted provided all components are operably coupled to the single-board computer 102.

In an embodiment the single-board computer 102 includes a microprocessor 114, device memory 116, device storage 118, and a network interface 120, each connected to a bus 122. The single-board computer 102 may also include an input/output (I/O) device interface 124 connecting I/O devices 126 (e.g., user I/O devices such as, keyboard, display, and mouse devices, sensor I/O devices such as pressure sensors, motion detectors, meters, temperature sensors, scales, RFID, GPS, and control I/O devices such as printer, robot, programmable logic controller, welder), ports 106, terminal block 108, and controls 110 and 112, a screen interface connecting the screen to the single-board computer 102, and/or a network interface 120 to the Node Device system.

Single-board computer 102 is a specialized system specifically designed to perform the steps and actions necessary to execute methods 300 and 400 and Node Device system 200. While some of the component options for the single-board computer 102 may include components prevalent in other computing systems, the single-board computer 102 is a specialized computing system specifically capable of performing the steps and processes described herein and specifically designed to have a small form factor, low processing power, low memory requirements, low storage requirements, low power consumption, be lightweight, compact and economical.

The microprocessor 114 is a programmable device that accepts digital data as input, is configured to process the input according to instructions or algorithms and provides results as outputs. Microprocessor 114 can include firmware code and/or software code for the functionality described herein. The firmware and/or software code is configured to integrate with various ERP systems and various automation devices. This provides compatibility for the user's environment and avoids having to obtain different equipment to allow for integration. The microprocessor 114 retrieves, loads, and executes programming instructions stored in the memory 116. The bus 122 is used to transmit programming instructions and application data between the microprocessor 114, I/O interface 124, network interface 120, and memory 116. Note, the microprocessor 114 can comprise a microprocessor and other circuitry that retrieves and executes programming instructions from memory 116. Examples of suitable microprocessors 114 are ARM processors, specifically the Broadcom BCM2711 ARM SoC microprocessor may be used.

The memory 116 can comprise any memory media readable by the microprocessor 114 that is capable of storing programming instructions and able to meet the needs of the Node Device 100 and execute the programming instructions required for methods 300 and 400 and Node Device system 200. The memory 116 is generally included to be representative of a random access memory. In addition, the memory 116 may include volatile and non-volatile, removable and non-removable media implemented in any method or technology for storage of information, such as computer-readable instructions or program components. The memory 116 may be implemented as a single memory device. The memory 116 can further include additional elements, such as a controller capable of communicating with the microprocessor 114.

Illustratively, the memory 116 may include multiple sets of programming instructions for performing the functions of the Node Device system 200 and methods 300 and 400, including, but not limited to, ERP connection management component 210, external device management component 220, automation component 230, and operation component 240, storage component 250, ERP communication driver component 260, and device communication driver component 270, all of which are discussed in greater detail herein. Although memory 116 as depicted in FIG. 1A includes seven sets of programming instruction components in the present example, it should be understood that one or more components could perform single- or multi-component functions. It is also contemplated that these components of Node Device 100 may be operating in a number of physical locations.

The storage 118 can comprise any storage media readable by the microprocessor 114 and is capable of storing data that is able to meet the needs of Node Device 100 and store the data required for methods 300 and 400 and Node Device system 200. The storage 118 may be a disk drive or flash storage device. The storage 118 may include volatile and non-volatile, removable and non-removable media implemented in any method or technology for storage of information. In an embodiment, the storage 118 is a fixed internal storage device, such as fixed solid-state drives (e.g., M.2 SSD), memory cards (e.g., MicroSD), or embedded MultiMediaCard (eMMC). The storage 118 can further include additional elements, such as a controller capable of communicating with the microprocessor 114. In an embodiment, the Node Device system 200 does not store any additional data other than generated automation instructions 132, ERP identification 134, workstation identification 130, device identification data 216, system data and code. In an embodiment, the Node Device system 200 only stores system data and code and retrieves the generated automation instructions 132, ERP identification 134, workstation identification 130, device identification data 216 upon start-up, maintaining this information in components in memory 116 rather than storage. Therefore, the size of storage 118 can be relatively small down to a minimum of 1 GB. Further, as the Node Device is a special purpose computer the frequency of accessing the storage 118 (loading and saving) is minimal and storage speed can be low.

Illustratively, the storage 118 may store data such as but not limited to automation instructions 132, ERP identification 134, workstation identification 130, and external automated device identification data 216, all of which are also discussed in greater detail herein. In general, ERP system data and job updates do not get stored in storage 118. More specifically, in an embodiment, data such as work data information 212, inventory location information, job information data 222, available job data 218, ERP inventory updates 224, and job information data updates 226 are only stored on the ERP system and used by the Node Device system but are not saved in Node Device storage 118. Further, in general, data such as node work information 232, node component location data 234, node job data 236, available node jobs 238, node inventory transactions, and node job data updates 244 are generated by the Node Device system but are only used temporarily by the system and not saved in Node Device storage 118.

Examples of memory 116 and storage 118 media include random access memory, read-only memory, flash memory, or any other medium which can be used to store the desired software components, firmware components, and system component, or information that may be accessed by an instruction execution system, as well as any combination or variation thereof. In some implementations, one or both of the memory 116 and storage 118 media can be a non-transitory memory and storage 118 media. In some implementations, at least a portion of the memory 116 and storage 118 media may be transitory. Memory 116 and storage 118 media may be incorporated into Node Device 100. While many types of memory 116 and storage 118 media may be incorporated into Node Device 100, the memory 116 and storage 118 media used is capable of executing the storage requirements of methods 300 and 400 and Node Device system 200 as described herein. As the Node Device is a special purpose computer with a specific form factor and requires minimal memory and storage, the suitable memory 116 and storage 118 devices are those that meet the form factor requirements and do not overpower the Node Device for its purpose.

The I/O interface 124 allows Node Device 100 to interface with I/O devices 126, ports 106, terminal block 108, and controls 110 and 112, including, but not limited to the automated equipment and devices at the workstation. I/O devices 126 can include, but are not limited to one or more traditional user I/O devices such as monitors, a mouse, a keyboard, a voice input device, a touch input device for receiving a gesture from a user such as the screen discussed further below, a motion input device for detecting non-touch gestures and other motions by a user, etc., sensor I/O devices such as pressure sensors, motion detectors, meters, temperature sensors, scales, RFID, GPS, and control I/O devices such as printer, robots, programmable logic controller, welder, etc., and other comparable I/O devices and associated processing elements capable of receiving input. Speakers, printers, haptic devices, or other types of output devices may also be included in the I/O device 126. I/O devices 126 may also include automated equipment and devices at the workstation.

A user can communicate with the Node Device 100 through the I/O device interface 124 and/or the display screen 104 discussed in more detail below in order to view node work information 232, node component location data 234, node job data 236, available node jobs 238, automation instructions, workstation identification, node automation identification data 246, output signal data 248, and input signal data 228, or complete any number of other tasks the user may want to complete with Node Device 100. I/O devices 126 can receive and output data such as but not limited to work data information 212, inventory location data 214, available job data 218, job information data 222, device identification data 216, input signal data 228, output signal data 248, ERP inventory updates 224, job information data updates 226, automation instructions, etc. This can be accomplished through the ports 106, terminal block 108, and controls 110 and 112, or any other I/O device 126.

As described in further detail herein, the single-board computer 102 may receive and transmit data from and to the network interface 120. In embodiments, the network interface includes, but is not limited to, ethernet interface (such as Gigabit Ethernet) (not pictured), wireless interface 150 (such as WiFi6), external WiFi antenna 151, internal WiFi antenna (not pictured). In embodiments, the network interface 120 operates to send and/or receive data, such as but not limited to, node work information 232, node component location data 234, node job data 236, available node jobs 238, automation instructions, workstation identification, node automation identification data 246, output signal data 248, and input signal data 228, to work data information 212, inventory location data 214, available job data 218, job information data 222, device identification data 216, input signal data 228, output signal data 248, ERP inventory updates 224, job information data updates 226, automation instructions to/from other devices and/or systems to which Node Device 100 is communicatively connected, and to receive and process interactions as described in greater detail below.

In an embodiment, the single-board computer 102 may be a Raspberry Pi, Orange Pi, Banana Pi, Khadas, Odroid, Radxa, Jeston Nano, Asus SBC Tinker board, Clockwork Pi, Quartz64, RockPro64, Libre Computer Board, or other equivalent off the shelf preconfigured single-board computer 102 meeting the processing, memory 116, storage 118, networking, and I/O device integration requirements indicated above. It should be understood that the above are merely examples of suitable single-board computers 102 capable of providing sufficient processing power, sufficient system memory, and sufficient system storage 118, while maintaining low power consumption, low component costs, and minimizing component size, and should not be considered limiting. In an embodiment, the Node Device 100 is a single-board computer 102 as listed above operably coupled to a carrier board 170 where both the single-board computer 102 and the carrier board 170 combined meet the processing, memory 116, storage 118, networking, and I/O device integration requirements indicated above.

In an embodiment, the display screen 104 is a color touchscreen with support to display a graphical user interface allowing a user to perform all operations on the Node Device without the need of a separate keyboard or mouse. In an embodiment, the display screen 104 can be any an LCD or LED display (measuring less than ten and one-half (10.5) inches diagonally, and preferably no smaller than a seven (7) inch diagonal measurement with no less than a 1024×600 resolution) and including a capacitive touch panel, an HDMI or USB controller board, and a screen keypad board (the screen keypad board is optional, alternatively separate external input devices may be used, as indicated below). Further, it should be understood that the Node Device is capable of connecting to a traditional separate keyboard and/or mouse if that functionality is desired. It should be understood that the above characteristics are merely an example of an acceptable touchscreen and that other touchscreens may be used including those that are black and white or greyscale, screens that are text only and do not support a graphical user interface, and those of different dimensions, provided the screen is compatible with the Node Device enclosure. Some of these contemplated embodiments may require the inclusion of externally connected input devices to perform operations on the Node Device such as a keyboard, a mouse, a trackpad, etc. In an embodiment, the display screen 104 is any traditional non-touchscreen compatible with the Node Device enclosure and single-board computer 102. In this embodiment, operation of the Node Device is accompanied by one or more externally connected input devices, such as, a traditional keyboard and/or mouse, etc. It should be understood that the display screen 104 includes an appropriate controller board for interfacing between the single-board computer 102 and the display screen 104.

In an embodiment, the variety of ports 106 for connecting to and communicating with external devices may include a power input port, USB ports (including, but not limited to, USB 2.0, USB 3.0, and USB C), HDMI ports, audio ports, ethernet port, etc. The ports 106 allow for the Node Device to connect to and integrate with other external input and output devices such as keyboard, mice, printers, speakers, monitors, headphones, and external devices or equipment at the workstation, etc. It should be understood that these are merely examples of external devices capable of connecting to the ports 106 and integrating with the Node Device and should not be considered limiting. The variety of ports 106 included may be individual ports or may be part of a port board which includes a variety of ports 106 on a single board. In an embodiment the ports 106 or port board are coupled to the single-board computer 102. In an embodiment, the ports 106 or port board are coupled to the carrier board 170.

In an embodiment, the terminal block 108 for controlling external devices and equipment is a GPIO terminal block. The terminal block 108 provides connection points for wired automatable devices/equipment, such as robots, programmable logic controller, photo eye, and any other type of switch, lights, alarms, or any other device that can receive sensor input instructions or provide sensor output data. The terminal block 108 allows the single-board computer 102 to provide automation instructions to the wired automated devices and receive sensor information and data back from the wired automated devices. It should be understood that this is merely an example of a terminal block and any terminal block capable of being connected to the single-board computer would be suitable. In an embodiment the terminal block 108 is coupled to the single-board computer 102. In an embodiment the terminal block 108 is coupled to the carrier board 170.

In an embodiment, the optional audio controls 110 and optional power controls 112 are external buttons and switches used to control power of the Node Device, and audio output from the Node Device. Additional controls for the screen and ports 106 may also be included. The controls can be any known suitable control in the art. In an embodiment the power controls 112 may be located along the power cord rather than on the Node Device 100.

Optionally, the Node Device includes an Ethernet card for connecting to the internet, the ERP system, or other network system. Additionally, optionally, the Node Device includes a Wi-Fi card for connecting to the ERP system, other network system, and wirelessly connectable automation devices and equipment (e.g. printers, robots, programmable logic controller, photo eye, and any other type of switch, lights, alarms, or any other device that can receive sensor input instructions or provide sensor output data). The same types of automated devices that can be wired to the terminal block 108 are the same types of automated devices that can be connected to the Node Device wirelessly, however, the particular device does need to have wireless capabilities.

The Node Device is enclosed with a protective case 128 that is designed to accommodate the above hardware. In an embodiment, the protective case 128 is essentially rectangular in shape with approximate dimensions of ten and one-half (10.5) inches by seven (7) inches by two (2) inches, with cutouts and/or voids for the display screen 104, ports 106, terminal block 108, and controls 110 and 112. In an embodiment, the cutout for the screen is sufficient to accommodate a display screen 104 with up to a ten (10) inch diagonal measurement. As indicated above, smaller screens are compatible with the protective case 128 as the protective case 128 is 3-D printed and the screen cutout in the case 128 can be made to fit the screen size used. In another embodiment, an adaptive gasket or other connective frame may be used around a smaller screen to mate the screen with the protective case 128, rather than changing the screen cutout size for the protective case 128. The protective case 128 may be made of a number of different components that make up the case as a whole. In an embodiment the protective case 128 includes a top segment 172, a bottom segment 174, and a back segment 176. When coupled together these segments enclose the screen and hardware of the Node Device 100. It should be understood that different combinations and segments are contemplated and the above is merely an example.

In an embodiment, the protective case 128 is 3-D printed plastic, such as ABS+resin made up of two parts such as an upper housing and lower housing or a front-facing housing and a rear-facing housing. The protective case 128 may be designed to be drop resistant, dust-proof, waterproof, element proof, etc. in order to withstand the elements of a manufacturing environment dependent on the need for the intended installation location. This may include but is not limited to compliance with water and/or dust codes and/or certifications such as IP69k and Class II Div II.

In an embodiment, the protective case 128 may be configured to be releasably attachable to different surfaces around a facility including a wall, a table, in any other way that a traditional computer monitor might be mounted (such as including a Vesa 75×75 mount pattern), etc. Additionally, due to the nature of the compact size of the Node Device, the protective case 128 may be configured to be releasably attached to different equipment mounts such as, but not limited to, a conveyor or platform leg or crossmember, piping supports, or a dedicated post for that monitor, piping systems, etc. In these embodiments the surfaces of the protective case 128 may include holes, protrusions, and other features allowing the Node Device to be installed at a variety of locations. In an embodiment, the protective case 128 is configured to be securely inserted into a cradle 158 or other holder device, which device is configured to be installed at a variety of locations at a facility allowing the Node Device to be portable. It should be understood that the above are merely examples of the protective case 128 and that any suitable method of manufacture and any suitable materials and format configuration may be used provided the minimal form factor and light weight of the Node Device is maintained.

The Node Device 100 is configured to integrate with and communicate with ERP systems and to integrate with and control automation devices and equipment. The Node Device 100 serves as a direct bridge between the ERP system and the automation devices and equipment at a workstation. When the Node Device is installed at a workstation it connects to the devices and equipment at the workstation and automates the devices and equipment at the workstation based on automation instructions and information provided by the ERP system and the workorders to be completed. In an embodiment, the Node Device is equipped to physically connect to equipment and devices at the workstation and to wirelessly connect to equipment and devices at the workstation dependent on the requirements of the equipment and devices.

In embodiments, the Node Device is completely self-contained in a 3-D printed case 128 and is equipped with a touchscreen, pins, A/C adaptor, optional battery pack (for mobility and/or battery backup), power switch, terminal block 108, and ports 106. The 3-D printed case 128 for containing the Node Device is capable of being mounted to most any surface in a manufacturing facility including a wall. This enables the installation of the Node Device at a workstation in a permanent, semi-permanent, or even mobile fashion. In an embodiment, other than the programming used to operate the Node Device, the automation instructions, and the programming used to integrate with the ERP system, the Node Device does not store or maintain any additional information or data. To this end, the Node Device is developed to minimize onboard hardware, memory 116, storage 118, power consumption, and size. This makes the Node Device significantly more economical, durable, and installable than traditional alternative options. The 3-D printed case 128 allows for the precise customized enclosure of all hardware equipment for the Node Device in a protected and durable fashion suitable for manufacturing and production workstations. Further the use of minimal onboard hardware and readily available components and the modularity of the Node Device allows for nearly on-demand delivery and implementation of the Node Device at a facility or workstation (generally a matter of days from order to installation). Whereas traditional ERP integration options and/or automation integration options typically require multiple months to assemble, plan, build, test, and implement. It should be understood that 3-D printing of the protective case 128 is not required but does allow for the most customization and compact fit of the case 128.

FIGS. 2A, 2B, and 2C depict a Node Device system 200 for integrating and communicating with an ERP system 202 and integrating and communicating with automation devices 204, according to embodiments.

The Node Device system 200 integrates with and interacts with an ERP system 202 and integrates with and interacts with a plurality of automated devices to automate jobs at workstations at locations of a facility and update the ERP system 202 with job status information in real-time. The Node Device system 200 is integrated with an ERP system 202, integrated with external automation devices 204 at a workstation, and optionally integrated with a workstation (not pictured). In an embodiment there are two phases for using the node device: 1) integration, and 2) manufacturing or processing. During integration the Node Device system 200 receives node device setup interactions including work data information 212 and inventory location data 214 from the ERP system 202, device identification data 216 from the connected external automation devices 204, and automation instructions are generated and stored (alternately automation instructions are received from the cloud or ERP system for the workstation identified). Once integrated (i.e., the manufacturing or processing phase), the Node Device system receives available job data 218 and job information data 222 and executes tasks and/or series of tasks (e.g., jobs) at the workstation (not pictured) by sending automation instructions to the external automation devices 204 (and/or displaying automation instructions on the Node Device screen), sending ERP inventory updates 224 and job information data updates 226 to the ERP system 202, and receiving input signal data 228 from the external automation devices 204 (and/or from a user through the graphical user interface).

The Node Device system 200 includes ERP connection management component 210 to send and receive data to and from the ERP system 202 and to integrate the Node Device 200 with the ERP system 202 and workstation, an external device management component 220 to send and receive data and signals to and from the connected automation devices 204 at the workstation (not pictured), an automation component 230 for generating automation instructions, an operation component 240 for executing tasks and series of tasks at the workstation (not pictured) using automation instructions, and a storage component 250. Each of these components will be described in greater detail below. Employees of companies utilizing the system (hereinafter users) may interact with the Node Device system 200 through the display screen 104, I/O devices 126, or the network interface 120.

The Node Device system 200 includes a display screen 104 and input/output devices 126, network interface 120, and ports 106 useable by users for interacting with the Node Device system 200, for viewing information provided by the ERP system 202, and for developing automation instructions 132. In an embodiment, the Node Device system 200 may be a processor or a combination of a processing system and a storage system with a preprocessing software component and optional storage component 250. The Node Device 100 is installed at a workstation at a facility or business, including remote location workstations.

In general, work data information 212 (described in further detail below) refers to information relating to the tasks and series of tasks that are able to be performed at the facility and/or workstation. The work data information 212 allows the Node Device system 200 (and/or a user of the Node Device system 200) to know what tasks and/or series of tasks are able to be completed at the facility (or workstation (not pictured)) to facilitate the generation of automation instructions. In an embodiment, the work data information 212 is not delivered to the node device system 200, but rather to a user at a remote device who will be generating automation instructions 132 for the node device system. In embodiments where the automation instructions 132 are generated remote from the node device system 200, the automation instructions 132 will be pushed to the node device system 200 through the network interface 120 either when requested by the node device system 200 or when manually installed on the node device system 200. In an embodiment the work data information 212 is delivered to both the Node Device system 200 and the remote user.

In general, inventory location data 214 (described in further detail below) refers to information relating to inventory components and location of inventory components that are used to complete tasks and/or series of tasks able to be completed at the workstation. The inventory location data 214 allows the Node Device system 200 (and/or a user of the Node Device system 200) to know what inventory components are used and where those inventory components are located for tasks and/or series of tasks able to be completed at the workstation to facilitate the generation of automation instructions 132. In an embodiment, the inventory location data 214 is not delivered to the node device system 200, but rather to a user at a remote device who will be generating automation instructions 132 for the node device system. In embodiments where the automation instructions 132 are generated remote from the node device system 200, the automation instructions 132 will be pushed to the node device system 200 through the network interface 120 either when requested by the node device system 200 or when manually installed on the node device system 200. In an embodiment the inventory location data 214 is delivered to both the Node Device system 200 and the remote user.

In general, device identification data 216 (described in further detail below) refers to information relating to external automation devices 204 connected to the Node Device for receiving automation instructions and providing input signal data 228 to the Node Device system 200. The device identification data 216 allows the Node Device system 200 (and/or a user of the Node Device system 200) to know what external automation devices 204 are connected to the Node Device to facilitate the generation of automation instructions. In an embodiment, the device identification data 216 is not delivered to the node device system 200, but rather to a user at a remote device who will be generating automation instructions 132 for the node device system. In embodiments where the automation instructions 132 are generated remote from the node device system 200, the automation instructions 132 will be pushed to the node device system 200 through the network interface 120 either when requested by the node device system 200 or when manually installed on the node device system 200. In an embodiment the device identification data 216 is delivered to both the Node Device system 200 and the remote user.

In general, job information data 222 (described in further detail below) refers to information relating to a particular task or series of tasks (e.g., job) scheduled to be completed (or already completed) at a workstation. The job information data 222 tells the Node Device system 200 which task and/or series of tasks are being completed at the workstation. In general, job or jobs refers to a task and/or series of tasks scheduled (or previously) executed at a workstation. It should be noted that even facilities without any workstations or with only a single workstation will be considered to have a workstation with a workstation identification as ERP systems are designed around the facility/company/business having one or more workstations.

In general, automation instructions are rules the Node Device system uses to process jobs at workstations and provide updates to the ERP system from workstations. The automation instructions may be based on providing signals to external automation equipment, may be based on receiving signals from external automation equipment, may be based on receiving user input from the Node Device screen, may be based on outputting information to the Node Device screen, may be based on the job being executed, may be based on data received from the ERP system, may be based on data received from the external automation equipment to be sent to the ERP system, and/or a combination of the above. The automation rules may provide instructions to external automation equipment 204, provide instructions to a user, and/or may provide updates to the ERP system 202.

Referencing FIGS. 2A and 2B, the Node Device system 200 includes an ERP connection management component 210. The ERP connection management component 210 interacts with the ERP system 202 and the rest of the Node Device system 200. In an embodiment, the ERP connection management component 210 performs initialization of the node with the ERP system and workstation, receives information from the ERP system to perform work orders at the workstation, and sends information to the ERP system based on work orders performed at the workstation, all in real-time. In addition to initialization, the ERP connection management component processes and converts data received from the ERP system 202 for use by the automation component 230 and the operation component 240 and processes and converts data received from the rest of the Node Device system 200 for use by the ERP system. The ERP connection management component 210 interacts with the ERP system 202 for both setup of the Node Device system 200 and operation of the Node Device system 200. These features are described in greater detail below.

In an embodiment, when the Node Device 100 is powered on at a workstation, the Node Device is initialized with the specific ERP system and the specific workstation using the ERP connection management component 201. The ERP connection management component 210 automatedly or semi-automatedly identifies the ERP system 202 to integrate with. In an embodiment, the storage component 250 includes one or more ERP communication driver components 260. Each ERP communication driver component 260 is designed to integrate and communicate with one or more specific ERP systems. The ERP system 202 may be automatedly identified by the Node Device system 200 using the ERP connection management component 210, may be user identified through the Node Device 100 using the ERP connection management component 210.

In an embodiment, upon powering on the Node Device 100, the ERP connection management component 210 identifies the ERP system 202 to which it is connected. In an embodiment, upon powering on, the ERP connection management component 210 sends an ERP identification request to the ERP system 202. The ERP system 202 responds to the request with the ERP identification. The ERP connection management component 210 compares the received ERP identification to the ERP communication driver components 260 and loads the corresponding ERP communication driver component 260 from the storage component 250. In an embodiment, the ERP connection management component 210 displays a request on the Node Device screen for a user to identify the ERP system 202. The ERP connection management component 210 receives an ERP identification from the user through the graphical user interface and loads the corresponding ERP communication driver component 260 into memory from the storage component 250. In an embodiment, the ERP communication driver components 260 may be stored remotely (e.g. remove server, cloud, etc.) and the Node Device, using the ERP connection management component 210 uploads the appropriate ERP communication driver component 260 from the remote location. In an embodiment, the correct ERP communication driver component 260 is preloaded into Node Device 200 memory and selection/determination of ERP communication driver component 260 is not needed.

The ERP connection management component 210 also receives a workstation identification. This may occur before, after, or near simultaneous to the ERP system identification. The workstation identification may be received automatedly from the ERP system 202 or may be user identified. In an embodiment the ERP connection management component 210 sends a workstation identification request to the ERP system 202 for the workstation identification. In an embodiment, the workstation identification request includes a list of automated device identifications at the workstation (not pictured). The ERP system 202 may use the list of automated device identifications to automatedly identify the workstation (not pictured). The automated device identifications include data that identifies what automated devices are connected to the Node Device 100 at the workstation (not pictured). This will be described in greater detail below. The ERP connection management component 210 receives the workstation identification from the ERP system 202 and sets the workstation identification for the Node Device 100. In an embodiment, the ERP connection management component 210 displays a request on the Node Device screen for a user to identify the workstation (not pictured). The ERP connection management component 210 receives a workstation identification from the user through the graphical user interface and sets the workstation identification on the Node Device 100. In an embodiment, the workstation identification is input into the Node Device prior to installation at the workstation. In an embodiment, the ERP connection management component 210 sends the workstation identification request to a remote device (server, computer, cloud, website, etc.) for the workstation identification.

As indicated above, even in facilities, businesses, and companies that have only a single workstation or no workstations, the Node Device system 200 is still provided with a workstation identification since ERP systems are designed to work based on workstation identifications. It should be understood that if an ERP system were designed to work off of a different station identification system or allow that no station identification be needed, then, in a facility where there only is one workstation, the workstation identification component may not be used.

The workstation identification is a unique number or other form of unique identification data (or any other manner of uniquely identifying the workstation (not pictured)) for the workstation (not pictured) that is known by the ERP system 202 as the unique identification for the workstation (not pictured) within the facility, company, business, etc.

Once the Node Device 100 is integrated with the ERP system 202 and the workstation identification is set, the Node Device system 200 is initialized to interact with the ERP system 202 in real-time from the workstation. After initialization the ERP connection management component 210 interacts in real-time with the ERP system 202. The ERP connection management component 210 requests data and information from the ERP system 202, sends data and information to the ERP system, send data and information to other Node Device components, and receives data and information from other Node Device components. The ERP connection management component 210 processes the data and information it receives for use by the system or component that is to receive the data and information. In an embodiment, the ERP connection management component 210 may be a processor or a combination of a processing system and a storage system with a preprocessing software component and optional preprocessing storage contained within the Node Device 100.

In an embodiment, the data received by the ERP connection management component 210 from the ERP system 202 can be categorized as Node Device setup data and Node Device operation data. Node Device setup data includes but is not limited to r work data information 212 and inventory location data 214. In an embodiment, when the Node Device 100 is first being integrated with a workstation (not pictured), the Node Device receives work data information 212 (data pertaining to the tasks and/or series of tasks that might be performed at the workstation (not pictured)) and inventory location data 214 (data pertaining to the components and location of components about the facility associated with completing the tasks and/or series of tasks that might be performed at the workstation (not pictured)) from the ERP system 202 to aid in generating automation instructions for the workstation (not pictured) (described in greater detail below).

In an embodiment, The ERP connection management component 210 requests work data information 212 from the ERP system 202 and inventory location data 214 from the ERP system 202 based on the workstation identification assigned to the Node Device 100. The ERP connection management component 210, using the loaded/identified ERP communication driver component 260 performs preprocessing steps on the received work data information 212 and inventory location data 214 and generates node work information 232 and node component location data 234 for use by the automation component 230 (as described in greater detail below). In an embodiment, the work data information 212 and inventory location data 214 are received at a remote device and the automation instructions are generated on the remote device, rather than the Node Device, and transmitted to the Node Device either by wired or wireless means.

Node Device operation data includes, but is not limited to (1) data received from the ERP system 202 such as, available job data 218 and job information data 222; (2) data sent to the ERP system 202 such as, job information data updates 226 and ERP inventory updates 224; (3) data sent to the other Node Device components, such as node job data 233 and available node jobs 238; and (4) data received from the other Node Device components such as node inventory transactions 242 and node job data updates 244.

In an embodiment, once the Node Device 100 is integrated with a workstation (not pictured) and set up data has been completed (as described above), the Node Device requests and receives available job data 218 from the ERP system. The ERP connection management component 210 requests available job data 218 from the ERP system 202 based on the workstation identification assigned to the Node Device 100. In an embodiment, available job data 218 is a real-time list of pending work orders for the workstation (not pictured) (e.g., data pertaining to pending specific tasks and/or series of tasks to be completed at the workstation).

In an embodiment, the Node Device system 200 determines or identifies an available job data 218 (e.g., pending work order) to execute. Based on the work order selected from the available job data 218, the ERP connection management component 210 requests job information data 222 from the ERP system 202. In an embodiment, the job information data 222 includes information for the selected particular pending work order (e.g., job data 218 item selected) including, but not limited to, the steps for the specific task or series of tasks to be completed along with quantity, inventory, and/or time frame constraints, etc. The Node Device uses the available job data 218 and job information data 222 to execute the particular work order and provide automation instructions to connected automation devices 204 and/or the Node Device screen to process the work order.

The ERP connection management component 210 receives available job data 218 and job information data 222 from the ERP system and performs preprocessing steps on the received available job data 218 and job information data 222 using the selected/identified ERP communication driver component 260 to generate available node jobs 238 and node job data 236 for display to the graphical user interface on the Node Device screen as requested and for use by the operation component 240 (as described in greater detail below).

In an embodiment, the ERP connection management component 210 receives node inventory transactions 242 and node job data updates 244 from other Node Device components. The ERP connection management component 210, using the ERP communication driver component 260 performs preprocessing steps on node job data updates 244 and node inventory transactions 242 to generates job information data updates 226 and ERP inventory updates 224 for automated transmission to the ERP system 202 (as described in greater detail below).

In an embodiment, the Node Device setup interactions/events and operation interactions/events are triggered automatedly when the automation component 230 determines the Node Device 100 has been integrated with the workstation identification (as described in greater detail below). In an embodiment, the Node Device setup interactions/events and operation interactions/events are triggered when a user inputs a request through the graphical user interface of the Node Device screen to enter Node Device operation mode.

As indicated above, the ERP connection management component 210 performs node device setup interactions when in setup mode. In an embodiment, the ERP connection management component 210 sends a request to the ERP for work data information 212 based on the assigned workstation identification of the Node Device 100. In response to the request, the ERP system 202 provides all work data information 212 associated with the assigned workstation identification to the ERP connection management component 210. The work data information 212 includes but is not limited to data pertaining to all types of work that may be performed at the workstation (not pictured) associated with the workstation identification. The types of work performed at a workstation (not pictured) may vary greatly and encompass any task or series of tasks that are set up and scheduled to be completed at a workstation (not pictured). As a nonlimiting example, a workstation (not pictured) may be a production workstation setup to perform all tasks for assembling a wagon or may be a set up to perform one task of attaching the wheels to the base of a wagon. As another nonlimiting example, a workstation (not pictured) may be a mail sorting workstation. Regardless of the work performed at a workstation (not pictured), the ERP system 202 knows what work tasks are able to be completed at each workstation (not pictured) and provides all work data information 212 for all tasks and/or series of tasks that may be completed at a workstation (not pictured).

The work data information 212 provided by the ERP system 202 to the ERP connection management component 210 may vary depending on the ERP system 202. The ERP system 202 provides work data information 212 for each available work task and/or series of tasks that may be completed at the workstation (not pictured). Work data information 212 may include, but is not limited to work task identification (unique number identifying the task or series of tasks to be completed), work task name (name associated with the work), work description (brief textual description of the task or series of tasks associated with the work to be completed), average completion time for a single quantity of the task, and list of inventory parts and quantities needed to complete one iteration of the task or series of tasks. It should be understood that these are merely examples of the data that may be included with the work data information 212 and that the ERP system 202 will provide any and all work data information 212 associated with the job. It should also be understood that while the list of inventory parts and other data indicated above is described as a single piece of data this data may be stored in the ERP as one or more pieces of data and will be provided to the ERP connection management component 210 as stored in the ERP system 202. This is true for all data provided from the ERP system 202 to the Node Device system 200. In an embodiment, each work data information 212 may be represented as a work data structure including fields for all associated information. In an embodiment, each work data information 212 may be represented as an object, including attributes for all associated information. It should be understood that these are merely examples and that any appropriate structure for associating the data parts with the associated work data information 212 may be used.

In addition to requesting the work data information 212, in an embodiment, the ERP connection management component 210 sends a request to the ERP for inventory location data 214 based on the assigned workstation identification of the Node Device 100. In response to the request, the ERP system 202 provides inventory location data 214 associated with the assigned workstation identification to the ERP connection management component 210.

The inventory location data 214, includes, but is not limited to data pertaining to the identification and location of components/inventory used to complete the types of work that may be performed at the workstation (not pictured) associated with the workstation identification. The components/inventory used to complete the work at a workstation (not pictured) may vary greatly and encompass any components/inventory that are associated with a task or series of tasks to be completed at the workstation (not pictured). As nonlimiting examples and using the workstation (not pictured) examples from above, a workstation (not pictured) may be a production workstation setup to perform all tasks for assembling a wagon or may be a set up to perform one task of attaching the wheels to the base of a wagon. The components associated with completing the tasks for this workstation (not pictured) may include wheels, a base, a handle, attachment components (screws, washers, nuts, etc.) for attaching the wheels and handle to the base, etc. As another nonlimiting example, a workstation (not pictured) may be a mail sorting workstation. The components associated with completing the tasks for this workstation (not pictured) may include envelopes of mail to be sorted. Regardless of the work performed at a workstation (not pictured), the ERP system 202 knows what work tasks are able to be completed at each workstation (not pictured) for the facility and what components/inventory are associated with the work tasks to be completed at a workstation (not pictured).

The inventory location data 214 provided by the ERP system 202 to the ERP connection management component 210 may vary depending on the ERP system 202. The ERP system 202 provides inventory location data 214 for each component associated with an available work task and/or series of tasks that may be completed at the workstation (not pictured). Inventory location data 214 may include, but is not limited to inventory component identification (unique number identifying the component or group of components), inventory component name (name associated with the component), inventory component description (brief textual description of the component), component color or other physical characteristic classification (e.g. weight that a sensor device could use to distinguish the component from a similar component), and a physical location at the facility where the inventory component is stored (the physical location is a unique location about the facility mapped to the automation devices 204 and known to workers and automation devices 204 at the workstation (not pictured) so the inventory component can be automatedly found by an automation device (e.g. robot) or easily found by the worker). It should be understood that the physical location may be represented in a variety of formats including but not limited to coordinate locations, based on a grid of the facility, distance and compass direction from a known object in the facility or at the workstation (not pictured), GPS location, etc. It should further be understood that the location of a component may not be a specific location, but instead may be a relative location with additional instructions to then use an RFID reader to locate the correct component. It should be understood that these are merely examples of the data that may be included with the inventory location data 214 and that the ERP system 202 will provide any and all inventory location data 214 associated with the inventory component. It should also be understood that while the data parts indicated above is described as a single piece of data this data may be stored in the ERP as one or more pieces of data and will be provided to the ERP connection management component 210 as stored in the ERP system 202. This is true for all data provided from the ERP system 202 to the Node Device system 200. In an embodiment, each inventory location data 214 may be represented as an inventory location data structure including fields for all associated information. In an embodiment, each inventory location data 214 may be represented as an object, including attributes for all associated information. It should be understood that these are merely examples and that any appropriate structure for associating the data parts with the associated inventory location data 214 may be used.

The ERP connection management component 210, using an ERP communication driver component 260, processes and converts the received work data information 212 into node work information 232 and converts the received inventory location data 214 into node component location data 234.

In an embodiment, the node work information 232 includes one or more data points that describe a task or series of tasks able to be completed at the workstation (not pictured) in a format appropriate for providing to the automation component 230 and for displaying on the graphical user interface of the Node Device screen. In an embodiment the node work information 232 may include all of the data included in the corresponding work data information 212, one or more of the individual data included in the associated corresponding work data information 212, and/or a combination or modification of one or more of the individual data included in the associated corresponding work data information 212. In an embodiment, each node work information 232 corresponds to a work data information 212 and may be represented as a node work data structure including fields for all associated converted and/or modified data. In an embodiment, each node work information 232 may be represented as an object, including attributes for all associated converted and/or modified data. It should be understood that these are merely examples and that any appropriate structure for associating the converted and/or modified data with the associated node work information 232 may be used.

For example, the work data information 212 received may provide a component list as a separate data point from the quantity of component to be used, whereas the Node Device may present the component list together with the quantity of component in a table format with the quantity listed in one column and the component listed in another column. The ERP communication driver component 260 may take the component list from the work data information 212 and the component quantity from the work data information 212 and generate a component and quantity table for the node work information 232. It should be understood that this is merely an example and the ERP communication driver component 260 can convert, modify, and generate the work data information 212 to conform to any desired format for the node work information 232.

In an embodiment, the node component location data 234 includes one or more data points that describe a component and a location of the component for a task or series of tasks able to be completed at the workstation (not pictured) in a format appropriate for providing to the automation component 230 and for displaying on the graphical user interface of the Node Device screen. In an embodiment the node component location data 234 may include all of the data included in the corresponding inventory location data 214, one or more of the individual data included in the associated corresponding inventory location data 214, and/or a combination, modification, or generation of one or more of the individual data included in the associated corresponding inventory location data 214. In an embodiment, each node component location data 234 corresponds to an inventory location data 214 and may be represented as a node component location data 234 structure including fields for all associated converted or modified data. In an embodiment, each node work information 232 may be represented as an object, including attributes for all associated converted or modified data. It should be understood that these are merely examples and that any appropriate structure for associating the converted data with the associated node work information 232 may be used. As a nonlimiting example of inventory location data 214 that may need modification and/or conversion by the ERP communication driver component 260 into node component location data 234, the location of the inventory component may be reported to the ERP connection management component 210 based on two coordinate locations (e.g., the coordinate location of the inventory component and the coordinate location of a device or other point of reference at the workstation (not pictured)); however, the Node Device system 200 may require the location of the inventory component to be reflected as a distance and compass direction from the coordinate location of the device or other point of reference at the workstation (not pictured). Therefore, the customer ERP communication driver component 260 may use the two coordinate locations to generate a distance between the two coordinate locations and a compass direction from the coordinate location of a device or other point of reference at the workstation (not pictured).

In an embodiment the ERP communication driver component 260 converts, modifies and/or generates and maps the received work data information 212 to the appropriate node work information 232 and converts, modifies and/or generates and maps the received inventory location data 214 to the appropriate node component location data 234. In an embodiment, the mapping may correspond directly between the representation of the data by the ERP system 202 and the representation of the data by the Node Device. In an embodiment, the conversion requires the ERP communication driver component 260 to combine, modify, manipulate, and/or generate data from the ERP system 202 to be appropriately represented as data in the Node Device system. The ERP communication driver component 260 accomplishes this by having predetermined ERP work format configurations for the format of the work data information 212 coming from the ERP system 202 and predetermined ERP inventory location format configurations for the format of the inventory location data 214 coming from the ERP system 202. The ERP communication driver component 260 also includes predetermined node device work format configurations for the format of the node work information 232 and predetermined node device inventory location format configurations for the format of the node component location data 234 for providing to the automation component 230 and for displaying through the graphical user interface of the Node Device 100. Based on the predetermined ERP format configuration and the predetermined node device format configuration, the ERP communication driver component 260 performs the appropriate processing, manipulation, generation, and conversion of the received data to correspond to the node device format data.

Converting, modifying, and/or transforming the data received from the ERP system into node data allows the Node Device system 200 to be modular such that it can integrate with any number of ERP systems yet still maintain the same functionality regardless of the ERP system 202 and provide the same output and display regardless of the ERP system 202. Each ERP system 202 may store and represent work data information 212 and inventory location data 214 differently and may provide different data or data in different formats to the ERP connection management component 210 on the Node Device. By converting, modifying, and/or transforming the data received from the ERP system 202 into node data (e.g., node work information 232, node component location data 234, etc.), the Node Device system can essentially operate independent of the ERP system 202.

The ERP connection management component 210 provides the node work information 232 and the node component location data 234 to the automation component 230 for generation of automation instructions and provides the node work information 232 and the node component location data 234 to the graphical user interface of the Node Device screen when requested for display. In an embodiment, the automation component 230 is located directly on the Node Device. In an embodiment, the automation component 230 is located remotely from the Node Device and the generation of automation instructions is performed remotely from the Node Device. In this embodiment, the generated automation instructions are transmitted to the Node Device once generated remotely either through wired or wireless communication.

As indicated above, the ERP connection management component 210 performs node device operation interactions when in operations mode. The Node Device is in operations mode once it is initialized to an ERP system and workstation and once automation instructions have been generated and received/stored on the Node Device. In an embodiment, the ERP connection management component 210 sends a request to the ERP system 202 for available job data 218 based on the assigned workstation identification of the Node Device 100. It should be understood that in an embodiment, the ERP system 202 sends a prompt to the ERP connection management component 210 to receive the available job data 218 or just sends the available job data 218 without an actual or formal request from the ERP connection management component 210. In an embodiment, ERP connection management component 210 sends a request to the ERP system 202 for job information data 222 for a particular work order based on input received from the operation component 240 to execute a particular workorder from the available job data 218 (described in further detail below). In response to the request, the ERP system 202 provides the requested data (available job data 218 and/or job information data 222 dependent on the request) to the ERP connection management component 210.

The available job data 218 includes but is not limited to data pertaining to all pending, started, and completed jobs (e.g., work orders) from the ERP system 202 for the workstation identification. The available job data 218 (e.g., jobs or work orders) are specific tasks and/or series of tasks scheduled or previously performed at the workstation (not pictured). In an embodiment, the available job data 218 includes, but is not limited to a unique job identification number or indication, an associated task or series of tasks to be performed at the work station, a status of the job (e.g. pending, completed, in process, cancelled, etc.), a quantity to be completed, a job type, a description of the job, and a time frame indication (e.g., mandatory start time, mandatory completion time, completion time range, etc.). As illustrated in the appendix, the available job data 218 may include more or less of the above listed data.

Further, similar to the work data information 212 and inventory location data 214 described above, the available job data 218 provided by the ERP system 202 to the ERP connection management component 210 may vary depending on the ERP system 202. It should be understood that these are merely examples of the data that may be included with the available job information and that the ERP system 202 will provide any and all available job information requested for the workstation identification. It should also be understood that while the individual data points indicated above are described as a single piece of data this data may be stored in the ERP as one or more pieces of data and will be provided to the ERP connection management component 210 as stored in the ERP system 202. This is true for all data provided from the ERP system 202 to the Node Device system 200. In an embodiment, each available job data 218 may be represented as an available job data structure including fields for all associated information. In an embodiment, each available job data 218 may be represented as an object, including attributes for all associated information. It should be understood that these are merely examples and that any appropriate structure for associating the available job data 218 parts with the associated available job data 218 may be used.

The job information data 222 includes but is not limited to data pertaining to a specific job from the list of available job data 218 (e.g., data pertaining to a specific work order). In an embodiment, the job information data 222 includes the same data as the available job data 218 associated with the job information data 222. In an embodiment, the job information data 222 includes additional work order information not included in the available job data 218. The additional work order information may include, but is not limited to, listing of inventory parts needed for the work order, specific steps needed to complete the work order, quality control points, tracking data (e.g., lots, serial numbers, etc.), etc. This additional work order information is requested from the ERP system 202. Similar to the work data information 212 and inventory location data 214 described above, the job information data 222 provided by the ERP system 202 to the ERP connection management component 210 may vary depending on the ERP system 202.

It should be understood that the ERP system 202 will provide any and all job information data 222 requested. It should also be understood that while the individual data points of data may be described as a single piece of data; however, this data may be stored in the ERP as one or more pieces of data and will be provided to the ERP connection management component 210 as stored in the ERP system 202. This is true for all data provided from the ERP system 202 to the Node Device system 200. In an embodiment, each available job data 218 may be represented as an available job data 218 structure including fields for all associated information. In an embodiment, each available job data 218 may be represented as an object, including attributes for all associated information. It should be understood that these are merely examples and that any appropriate structure for associating the job data parts with the associated job information data 222 may be used.

The ERP connection management component 210, using an ERP communication driver component 260, processes, converts, modifies, or generates the received available job data 218 into available node jobs 238 and processes, converts, modifies, or generates the received job information data 222 into node job data 236. In an embodiment, the processing, conversion, modification, and generation is substantially similar, if not the same as indicated above for the work data information 212 and inventory location data 214 received from the ERP system 202 in the node device setup interactions.

In an embodiment, the available node jobs 238 each include one or more data points that describe a specific work order available to be completed (or already completed) at the workstation (not pictured) in a format appropriate for providing to the operation component 240 and for displaying on the graphical user interface of the Node Device screen. In an embodiment, the available node jobs 238 may include all of the data included in the corresponding available job data 218, one or more of the individual data included in the associated corresponding available job data 218, and/or a combination or modification of one or more of the individual data included in the associated corresponding available job data 218. In an embodiment, each of the available node jobs 238 corresponds to an available job data 218 and may be represented as an available node jobs data structure including fields for all associated converted, modified, and/or generated data. In an embodiment, each available node jobs 238 may be represented as an object, including attributes for all associated converted, modified, and/or generated data. It should be understood that these are merely examples and that any appropriate structure for associating the converted, modified, and/or generated data with the associated available node jobs 238 may be used.

In an embodiment, the node job data 236 each include one or more data points that describe a specific work order identified by the operation component 240 from the list of available node jobs 238 to be completed (or already completed) at the workstation (not pictured) in a format appropriate for providing to the operation component 240 and for displaying on the graphical user interface of the Node Device screen. In an embodiment the node job data 236 may include all of the data included in the corresponding job information data 222, one or more of the individual data included in the associated corresponding job information data 222, and/or a combination or modification of one or more of the individual data included in the associated corresponding job information data 222. In an embodiment, each of the node job data 236 corresponds to a job information data 222 and may be represented as a node job information data structure including fields for all associated converted, modified, and/or generated data. In an embodiment, each node job data 236 may be represented as an object, including attributes for all associated converted, modified, and/or generated data. It should be understood that these are merely examples and that any appropriate structure for associating the converted, modified, and/or generated data with the associated node job data 236 may be used.

Reasons for conversion, modification, manipulation, and/or transformation of the available job data 218 and job information data received from the ERP system 202 are substantially the same as the reasons for converting work data information 212 and inventory location information as described above.

In an embodiment, similar to as described above for converting work data information 212 and inventory location data 214, the ERP communication driver component 260 converts, transforms, and maps the received available job data 218 to the appropriate available node jobs 238 and converts, transforms, and maps the received job information data 222 to the appropriate node job data 236. In an embodiment, the mapping may correspond directly between the representation of the data by the ERP system 202 and the representation of the data by the Node Device. In an embodiment, the conversion requires the ERP communication driver component 260 to combine, modify, generate, and/or manipulate data from the ERP system 202 to be appropriately represented in the Node Device system. In an embodiment, the ERP communication driver component 260 accomplishes this by having predetermined ERP available job format configurations for the format of the available job data 218 coming from the ERP system 202 and predetermined ERP job information data 222 format configurations for the format of the job information data 222 coming from the ERP system 202. In an embodiment the ERP communication driver component 260 also includes predetermined available node job format configurations for the format of the available node jobs 238 and predetermined node job data format configurations for the format of the node job data 236 for providing to the operation component 240 and for displaying through the graphical user interface of the Node Device 100. Based on the predetermined ERP format configurations and the predetermined node device format configurations, the ERP communication driver component 260 performs the appropriate processing, manipulation, generation, and conversion of the received data to correspond to the node device format data.

Converting, modifying, and transforming the data received from the ERP system 202 into node data allows the Node Device system 200 to be modular such that it can integrate with any number of ERP systems yet still maintain the same functionality regardless of the ERP system 202 and provide the same output and display regardless of the ERP system 202. Each ERP system 202 may store and represent job information data 222 (e.g., work order information) differently and may provide different data or data in different format to the Node Device. By converting, modifying, and transforming the data received from the ERP system 202 into node data the Node Device system can operate independent of each ERP system 202.

The ERP connection management component 210 provides the node job data 236 and available node jobs 238 to the operation component 240 for selecting and executing tasks and/or series of tasks from jobs to be completed at the workstation (not pictured) and provides the node job data 236 and available node jobs 238 to the graphical user interface of the Node Device screen when requested for display.

In addition to receiving data from the ERP system 202 and converting the received data to node device formatted data for use by the Node Device, the ERP connection management component 210 receives information from the operation component 240 to be sent to the ERP system 202. The operation component 240 provides the ERP connection management component 210 with updates, information, and data from the Node Device and workstation. The ERP connection management component 210 converts, modifies, and/or transforms the node data updates from the Node Device format to ERP formatted data updates and transmits the ERP formatted data updates to the ERP system 202. This enables the ERP system 202 to receive automated data, updates, and information from the Node Device system 200. In an embodiment the node data updates include but are not limited to node inventory transactions 242, node job data updates 244, and node updates 252. Similar to the conversions discussed above, the ERP communication driver component 260 converts, modifies, and/or transforms the node inventory transactions 242, node job data updates 244, and node updates 252 into ERP inventory updates 224, job information data updates 226, and ERP information updates 254, respectively.

In an embodiment, the node inventory transactions 242 include updates on the status and quantity of components used during job completion at the workstation (not pictured). These updates may be provided to the ERP connection management component 210 and the ERP communication driver component 260 from the operation component 240 at intervals during the completion of a job, at the end of completion of a job, in real-time as each component is removed from inventory, or based on any automation instruction providing for the update. Accordingly, the ERP connection management component 210, using the ERP communication driver component 260, may provide the ERP inventory updates 224 to the ERP system 202 in the same manner.

In an embodiment, the node job data updates 244 include updates regarding a work order including, but not limited to updates on the status of completion of a work order, updates regarding the progress of a work order, updates regarding estimated time to completion of a work order, flow rate, etc. These updates may be provided to the ERP communication driver component 260 from the operation component 240 at intervals during the completion of a job, at the end of completion of a job, in real-time as each quantity of the work order is completed or progressed or based on any automation instruction providing for the update. Accordingly, the ERP communication driver component 260 may provide the ERP inventory updates 224 to the ERP system 202 in the same manner.

The conversion, modification, or transformation of the node inventory transactions 242 and the node job data updates 244 into ERP inventory updates 224 and job information data updates 226 is accomplished by the ERP communication driver component 260 in a substantially similar manner as the conversions described above, but in a reverse context where the node data is being converted to ERP data in a format expected by the ERP system 202.

In an embodiment, the node updates 252 include updates, data, and information received by the ERP connection management component 210 to be sent to the ERP system 202 as ERP information updates 254. In an embodiment, the node updates 252 include any data or information from the Node Device that is not specifically related to a job/work order, this may include, but is not limited to updates pertaining to external automated devices, updates from sensors at the workstation, etc. These updates may be provided to the ERP connection management component 210 from the operation component 240 or the external device management component 220 at intervals during the completion of a job, at the end of completion of a job, in real-time as each quantity of the work order is completed or progressed, or based on any automation instruction providing for the update. Accordingly, the ERP connection management component 210 may provide the ERP information updates 254 to the ERP system 202 in the same manner.

The conversion, modification, or transformation of the node updates 252 into ERP information updates 254 is accomplished by the ERP communication driver component 260 in a substantially similar manner as the conversions described above, but in a reverse context where the node data is being converted to ERP data in a format expected by the ERP system 202.

It should also be understood that while the node inventory transaction 242, node job data updates 244, node updates 252, ERP inventory updates 224, job information data updates 226, and ERP information updates 254 are each described as a single piece of data this data may be sent by the operation component 240 as one or more pieces of data and will be provided to the ERP connection management component 210 as such or may be received by the ERP system 202 as one or more pieces of data and will be provided to the ERP system 202 as such. In an embodiment, each of the node inventory transaction 242, node job data updates 244, node updates 252, ERP inventory updates 224, job information data updates 226, and ERP information updates 254 may be represented as a data structure including fields for all associated information. In an embodiment, each of the node inventory transaction 242, node job data updates 244, node updates 252, ERP inventory updates 224, job information data updates 226, and ERP information updates 254 may be represented as an object, including attributes for all associated information. It should be understood that these are merely examples and that any appropriate structure for associating the data parts with the associated node inventory transaction 242, node job data updates 244, node updates 252, ERP inventory updates 224, job information data updates 226, and ERP information updates 254 may be used.

Referencing FIGS. 2A and 2C, the Node Device system 200 also includes an external device management component 220. The external device management component 220 interacts with the connected external automation devices 204 to identify the device, send automation instructions to connected external automation devices 204, and receive input signal data 228 from connected external automation devices 204. It should be understood that connected external automation devices 204 may be physically (wired) connected to the Node Device 100 or may be wirelessly connected to the Node Device 100.

In an embodiment, the external device management component 220 identifies connected external automation devices 204 based on the receipt of device identification data 216 from each connected external automation device. In an embodiment, the external device management component 220 converts the received device identification data 216 into node automation identification data 246 using a device communication driver component 270. The node automation identification data 246 is formatted for use by the automation component 230 to facilitate generation of automation instructions and for display on the graphical user interface. In an embodiment, the external device management component 220 uses a device communication driver component 270 to convert, modify, and/or transform the device identification data 216 to node automation identification data 246.

The device communication driver component 270 operates primarily the same way as the ERP communication driver component 260 component 260. In an embodiment, the external device management component 220 identifies connected external automation devices 204 based on a user inputting device identification data 216 into the graphical user interface of the Node Device screen. The input from the user to identify the external automated device may be one of a number of forms. In an embodiment, the input from the user may be in the form of selecting the external automated device to be identified from a list of external automated device options. In this embodiment, the device communication driver component 270 may have pre-defined node automation identification data 246 associated with the selected device or the external device management component 220 may send a request to the identified device requesting device identification data 216. In an embodiment, the input from the user may be in the form of data input into a screen or series of screens requesting the node automation identification data 246. Optionally, the external device management component 220 stores node automation identification data 246 in the storage component 250. It should be noted that this generally occurs when the Node Device is in startup mode, but it could occur after start up mode and an external automated device is either added or removed.

The device identification data 216 includes but is not limited to data pertaining to an external automation device 204 connected to the Node Device 100. The device identification data 216 requested by the external device management component 220 may vary dependent on the device. In general device identification data 216 will include a device ID, a type of device (e.g., printer, sensor, controllable device, etc.), connection port (e.g., USB, wireless, terminal block pin, etc.), communication protocol for the device, and the type of signal(s) expected. It should be understood that these are merely examples of the data that may be included with the device identification data 216 and that the device and/or user will provide all available data requested by the external device management component 220. It should also be understood that while the data parts indicated above are described as a single piece of data this data may be received by the external device management component 220 as one or more pieces of data. In an embodiment, each device identification data 216 may be represented as a device data structure including fields for all associated information. In an embodiment, each device identification data 216 may be represented as an object, including attributes for all associated information. It should be understood that these are merely examples and that any appropriate structure for associating the data parts with the associated device identification data 216 may be used.

The node automation identification data 246, includes, but is not limited to data pertaining to an external automation device 204 connected to the Node Device 100 that has been converted, modified, and/or transformed to an appropriate format for use by the automation component 230 and display through the graphical user interface on the Node Device screen. The node automation identification data 246 used by the automation component 230 and displayed on the Node Device screen may vary dependent on the device. In general node automation identification data 246 will include a device ID, a type of device (e.g., printer, sensor, controllable device, etc.), connection port (e.g., USB, wireless, terminal block pin, etc.), communication protocol for the device, and the type of signal(s) expected. It should be understood that these are merely examples of the data that may be included with the node automation identification data 246. It should also be understood that while the data parts indicated above are described as a single piece of data this data may be represented as one or more pieces of data. In an embodiment, each node automation identification data 246 may be represented as an automation device data structure including fields for all associated information. In an embodiment, each node automation identification data 246 may be represented as an object, including attributes for all associated information. It should be understood that these are merely examples and that any appropriate structure for associating the data parts with the associated node automation identification data 246 may be used.

When the Node Device system 200 is in operation mode, the external device management component 220 sends output signal data 248 to external connected devices based on automation instructions from the operation component 240 and receives input signal data 228 from the external automation devices 204. How the signals are sent and received is based on how the device is connected to the Node Device 100. If the external automation device is connected via the terminal block 108 the external device management component 220 will simply send the raw output signal data 248 received from the operation component 240 to the appropriate pin on the terminal block 108 corresponding to the output signal data 248 for the device. Similarly, for input signal data 228 the external device management component 220 will simply send the raw input signal data 228 received from the pin on the terminal block 108 to the operation component 240 with the pin indicator. The automation instructions will transform input signal data 228 and output signal data 248 for appropriate use by the automation instructions and/or display on the Node Device screen. If the external automation device is connected through a port (USB, HDMI, etc.) or wirelessly, the external device management component 220 includes signal converters for converting input signal data 228 and output signal data 248 based on the appropriate protocol.

The external device management component 220 transmits node automation identification data 246 to the automation component 230 to facilitate automation instruction generation. Optionally the external device management component 220 may transmit the node automation identification data 246 to the graphical user interface for display on the Node Device screen. The external device management component 220 transmits output signal data 248 to the appropriate external automation device and transmits input signal data 228 to the operation component 240.

Referring to FIG. 2A, the Node Device system 200 also includes an automation component 230. The automation component 230 generates, updates, and stores automation instructions. In an embodiment, when in setup mode, the automation component 230 receives node work information 232 and node component location data 234 from the ERP connection management component 210 and receives node automation identification data 246 from the external device management component 220. In an embodiment, the automation component 230 uses the node work information 232, the node component location data 234, and the node automation identification data 246 to facilitate the generation of automation instructions. In an embodiment the automation component 230 is located directly on the Node Device 100 and the automation instructions are generated directly on the Node Device 100. In an embodiment, the automation component 230 is located remote from the Node Device 100 and once generated the automation instructions are loaded onto the Node Device 100 either directly or wirelessly.

In an embodiment, the automation component 230 contains a set of pre-determined automation rules for generation automation instructions based on the received node work information 232, the node component location data 234, and the node automation identification data 246. The pre-determined automation rules may be industry, customer, worksite, and/or task specific and may be customized for each Node Device and/or each workstation. A non-limiting example of an automation rule may be whenever there is a node automation identification data 246 that includes type printer, generate an automation instruction that reports to the ERP whenever a printer is inactive.

In an embodiment, the automation component 230 includes a visual based automation programing language and editor that interfaces with the graphical user interface of the Node Device (or other remote device) that allows a user to build the automation instructions on the Node Device 100 (or other remote device for loading onto the Node Device 100). In this embodiment the node work information 232, node component location data 234, and node automation identification data 246 may be visually represented on the graphical user interface along with a visual representation of programming concepts and mathematical functions (for example, conditional statements "if," "when," comparisons, loops, mathematical functions, etc.). By using a visual based automation programing language, any person with knowledge of the tasks to be completed at workstations and the processes and equipment used for completing tasks at workstations can create automation instructions for workstation equipment and workorders for storing on the Node Device. The person developing the automation instructions requires no special programming skills or abilities, the only requirement is knowledge of the processes and tasks to be completed at the workstation(s). In an embodiment, a suitable visual programming language and/or application is Blockly. In an embodiment, suitable programming languages include wyliodrin, GraspIO, and NETLab Toolkit. These are merely examples, and any visual based programming language may be suitable.

In an embodiment, automation instructions are conditional based statements that allow for the automated control of external automated devices, the display of instructions on the Node Device screen, the display of information received from external automated devices on the Node Device screen, and the reporting of information and updates to the ERP system. The automation instructions allow the user to automate certain tasks and/or jobs at a workstation (not pictured). Automation instructions may be work type based (e.g., if job type x do y), automated equipment based (e.g., if conveyer a is full switch to conveyor b until conveyor a is not full then switch back), part based (if part a is needed for job x, robot b travel to location xyz to retrieve part a), reporting based (e.g., if quantity to complete job x is y report to ERP when job complete), oversight based (e.g., if emergency switch x is engaged, do y), received signal based (e.g. if pin 1 of terminal block equals x hertz, display x degrees on the display screen 104 or report x degrees to the ERP system 202).

Automation instructions are further used to translate input signal data 228 and output signal data 248 received through the terminal block 108. For example, signals received from the terminal block 108 are in hertz and sent in hertz, but those hertz may represent some type of analog unit or a Boolean representation. The automated instructions are also used to convert the terminal block 108 hertz signal into the appropriate representation. For example, if the signal received on pin 1 is a temperature an automated instruction may say if pin 1 equals 50-60 hertz, set temperature display to 50 degrees Fahrenheit. Further, the automated instructions can be used to send ERP inventory updates 224 and job information data updates 226 to the ERP system 202. For example, an automated instruction may say when pressure sensor 1 is x more than last pressure sensor reading send an ERP inventory update removing x wagons from the quantity to be completed in job xyz. These are merely simple examples of automation instructions that may be generated and should not be considered limiting.

The automation component 230 stores the automation instructions in the storage component 250. The automation instructions may be classified based on workstation identification, node work information 232 identification, or any other sort of classification that would allow the operation component 240 to load only those automation instructions that correspond to the selected job. The automation instructions may be modified, changed, updated, or added to when the Node Device is put into setup mode.

Referring to FIG. 2A, the Node Device system 200 also includes an operation component 240. The operation component 240 receives node job data 236 from the ERP connection management component 210. Based on the node job data 236, the operation component 240 loads the stored automation instructions from the storage component 250 and automatedly executes the automated instructions when the conditions for the automated instructions are met. To execute the automation instructions, the operation component 240 receives input signal data 228 from the external device management component 220, sends output signal data 248 to the external device management component 220, and sends node inventory transactions 242, node job data updates 244, and node updates 252 to the ERP connection management component 210. Based on the automation instructions the operation component 240 displays node job data 236 information on the Node Device screen, displays prompts to the user on the Node Device screen, and/or displays the automation instructions on the Node Device screen. In an embodiment, the operation component 240 displays the step by step instructions, progress and prompts on the Node Device screen as the job is being completed. The operation component 240 also receives input signal data 228 from a user through the graphical user interface of the Node Device.

FIG. 3 depicts a method 300 of integrating and creating automation instructions on a Node Device at a workstation, according to embodiments. In this embodiment, method 300 is for initial installation of the Node Device with an ERP system 202 and/or the workstation.

At 302, the Node Device is powered on at a workstation and an ERP system 202 is identified and the appropriate ERP communication driver component 260 is determined. The identification of the ERP system 202 may be determined automatically by the Node Device based on data/information sent to the Node Device by the ERP system. In an embodiment, the identification of the ERP system may be determined based on input from the user by selecting/identifying the correct ERP system 202 from a list of ERP systems displayed on the graphical user interface of the Node Device or by inputting the appropriate identification information on the graphical user interface of the Node Device.

At 304, optionally, the Node Device is connected to automation devices 204 and equipment at the workstation. The automation devices 204 may be connected to the Node Device wired or wirelessly dependent on the automation device.

At 306, the Node Device is assigned a workstation identification. The workstation identification is a unique identification number that tells the ERP system 202 and the Node Device at which workstation the Node Device is located and integrated with. The workstation identification may be automatedly determined by the Node Device based on the automation devices 204 connected in 304, may be provided to the Node Device from the ERP system, or may be manually entered by a user through the Node Device's graphical user interface.

It should be understood that 304 and 306 may be completed near simultaneously or in any order.

At 308, the ERP connection management component of the Node Device receives work data information 212 and inventory location data 214 based on the workstation identification from the ERP system 202. The work data information 212 includes data on the types of work and tasks performed at the workstation (not pictured) and the inventory location data 214 includes a physical location for inventory parts used for jobs at the workstation (not pictured). It should be understood if the workstation (not pictured) does not use inventory parts for work at the workstation (not pictured), this information is not provided. Based on the work data information 212 and inventory location data 214, the ERP connection management component generates node work information 232 and node component location data 234, respectively, and transmits the node work information 232 and node component location data 234 to the automation component.

At 310, optionally, the external device management component of Node Device receives device identification data 216 from the external automation devices 204 at the workstation that were connected in 304 above. The device identification data 216 includes equipment identification and equipment sensor information (such as pin information, sensor status, etc.). Based on the device identification data 216, the external device management component generates node automation identification data 246 and transmits the node automation identification data 246 to the automation component.

It should be understood that 308 and 310 can occur in any order or simultaneously/near-simultaneously.

At 312, automation instructions are generated for the Node Device to be implemented at the workstation. In an embodiment, automation instructions are generated based on node automation identification data 246, node work information 232, and node component location data 234 (respectively, device identification data 216, work data information 212, and inventory location data 214). The automation instructions allow the Node Device to automate tasks and parts of tasks at the workstation and to provide updates, data, and other information from the workstation to the ERP system. Automation instructions may be work type based (e.g., if job type x do y), automated equipment based (e.g., if conveyer a is full switch to conveyor b until conveyor a is not full then switch back), part based (if part a is needed for job x, robot b travel to location xyz to retrieve part a), reporting based (e.g., if quantity to complete job x is y report to ERP when job complete), or oversight based (e.g., if emergency switch x is engaged, do y), sensor based, time based, etc. These are merely simple examples of automation instructions that may be generated and should not be considered limiting.

In an embodiment, the automation instructions are generated by a user on graphical user interface of the Node Device using a visual based automation programing language and editor to build the automation instructions. In this embodiment, the node automation identification data 246, node work information 232, and node component location data 234 (respectively, the device identification data 216, work data information 212, and inventory location data 214) may be visually represented on the graphical user interface along with a visual representation of programming concepts and mathematical functions (for example, conditional statements "if," "when," comparisons, loops, etc.). By using a visual based automation programing language, any person with knowledge of the tasks to be completed at workstations and the processes and equipment used for completing tasks at workstations can create automation instructions for workstation equipment and workorders for storing on the Node Device. The person developing the automation instructions requires no special programming skills or abilities, the only requirement is knowledge of the processes and tasks to be completed at the workstation(s). In an embodiment, a suitable visual programming language and/or application is Blockly. In an embodiment, suitable programming languages include wyliodrin, GraspIO, and NETLab Toolkit. These are merely examples, and any visual based programming language may be suitable.

In an embodiment, the automation instructions are automatedly generated by the automation component based on the node automation identification data 246, node work information 232, and node component location data 234 (respectively, the device identification data 216, work data information 212, and inventory location data 214) for the workstation. The automation component may automatedly generate automation instructions using predetermined automation rules, which may be dynamically updated. In an embodiment, the automation component may be able to generate automation instructions using machine learning algorithms based on training data consisting of historic ERP system data for the facility including jobs, inventory, workstations, external automated devices, and automation instructions.

In an embodiment, the automation component resides within the Node Device and the automation instructions are generated directly on the Node Device. In an embodiment, the automation component resides external to the Node Device on a remote device and the automation instructions are generated on the remove device and loaded onto the Node Device either directly or wirelessly.

At 314, optionally the automation instructions are stored on the Node Device storage. In an embodiment, the Node Device only stores automation instructions associated with the workstation at which the Node Device is integrated. In an embodiment, the Node Device may store automation instructions for a plurality of workstations. In an embodiment, the automation instructions, the workstation identification, the ERP identification, and the device identification data are stored in the Node Device storage. In an embodiment the automation instructions, the workstation identification, the ERP identification, and the device identification data are stored remotely (e.g., on a server, on the cloud, on a remote device, etc.) from the Node Device and can be loaded onto the Node Device or a different Node Device at a different time.

At optional 316, the automation instructions are modified, updated, and/or new automation instructions are generated and stored on the Node Device. It should be understood that the modification, update and addition of automation instructions can be accomplished manually by a user or may be done dynamically by the automation component when updated node work information 232, node component location data 234, and/or node automation identification data 246 is received by the automation component.

FIG. 4 depicts a method 400 of operating a Node Device at a workstation once integrated with the ERP system 202, external automation devices 204 at the workstation, and automation instructions have been generated, according to embodiments. In this embodiment, method 400 is completed on a Node Device that has previously been integrated with the ERP system 202, the workstation, and automation instructions were previously generated.

At 402, the Node Device is powered on and loads the identified ERP communication driver component 260 for the identified the ERP system 202. In an embodiment, the ERP system identification and ERP communication driver component identification are stored on the Node Device. In an embodiment, the ERP system identification and ERP communication driver component identification are stored remote from the Node Device and the Node Device requests and receives this data from remote storage, which can be wired or wireless.

At optional 404, the Node Device performs authentication through the ERP system 202. In an embodiment, authentication includes user login and validation. The user credentials are sent to the ERP system 202 and verified, similar to a user logging into the ERP system directly.

At 406, the Node Device receives the workstation identification, optionally this is the same workstation identification it was last integrated with. Optionally the Node Device maintains an indication of the previously integrated workstation(s) and verifies the workstation identification received is one of the previously integrated workstation(s). Alternatively, the Node Device maintains an indication of the last integrated workstation (not pictured) and automatically assigns the same workstation identification. In embodiments where the previous workstation(s) are not stored on the Node Device or remote from the Node Device for upload or where the workstation is not the same as a previous workstation, the workstation identification operates the same as 306 in FIG. 3. Automation instructions are loaded into memory for the Node Device based on the workstation identification. The automation instructions may be loaded from Node Device storage or from a remote location.

At 408, the ERP connection management component of Node Device requests and receives available job data 218 from the ERP system 202 for the workstation identification. The ERP connection management component generates available node jobs 238 based on the received available job data 218 and transfers the available node jobs 238 to the operation component. The operation component populates the graphical user interface with the available node jobs 238 (available job data 218). In an embodiment, available node jobs 238 (available job data 218) is one or more specific job orders for a work type completed at the workstation (not pictured). For example, a specific job to be completed for a type of work or type of task/series of tasks that is completed at the workstation (not pictured), such as, but not limited to, assemble 12 wagons by a certain time on a certain date or install wheels on 12 wagon bases starting at a specified time on a specified date or needing to be completed by a particular date, etc. These are merely examples of work information and job information used for discussion purposes. It should be further understood that job information and work information may contain more details, data, and instructions than indicated in the example. In an embodiment, the available node jobs 238 need not be displayed on the graphical user interface but are merely transferred to the operation component for processing.

At 410, the operation component of Node Device receives a request to perform one of the available jobs from the available node jobs 238 (available job data 218). In an embodiment, this request may be received by a user selecting a job to be completed from the list of available node jobs 238 (available job data 218) displayed on the graphical user interface. As indicated above, the operation component 240 loads the automation instructions associated with the workstation identification. In an embodiment, the request may be based on the automated instructions loaded onto the Node Device based on the available node jobs 238 (available node data 218). In an embodiment, the request may be an automated request received from the ERP system 202 based on a set of predetermined job prioritization rules.

At 412, the ERP connection management component of the Node Device requests job information data 222 from the ERP system 202 based on the selected available node job 238 (available node data 218). The job information data 222 includes inventory transactions associated with the job, status information for the job (e.g., job duration, job state, other particulars for the job). The ERP connection management component receives the requested job information data 222, generates node job data 236 based on the job information data 222, and transfers the node job data 236 to the operation component. The operation component populates the graphical user interface with the node job data 236 (job information data 222). In an embodiment, the operation component does not display the node job data 236 on the graphical user interface.

At 414, the operation component executes automation instructions based on the node job data 236. In an embodiment, the automation instructions are for controlling the external automated devices 204. The operation component of the Node Device provides automation instructions to external automation devices 204 through the external device management component 220 based on the conditions for the automation instructions being met and the node job data 236.

At 416, the automation instructions are for reporting/controlling the ERP system. The operation component Node Device provides node inventory transactions 242, node job data updates 244, and/or node updates 252 (respectively ERP inventory updates 224, job information data updates 226, and/or ERP information updates 254) for job details, job status, sensor information, and inventory updates to the ERP system 202 based on automation instructions. In an embodiment, the Node Device further node inventory transactions 242, node job data updates 244, and/or node updates 252 (respectively ERP inventory updates 224, job information data updates 226, and/or ERP information updates 254) for job details, job status, and inventory to the ERP system 202 based on user input information into the graphical user interface of the Node Device.

It should be understood that 414 and 416 may be performed in any order and may be repeated as many times as the operation component directs based on the automation instructions and processing of node job data 236, which may consist of a single operation for a job or may consist of a series of operations for a job.

At 418, the Node Device determines the selected job is completed, stopped, or paused. In other words, all of the node job data 236 has been processed or the processing of the node job data 236 has been stopped or paused before completion. In an embodiment, the Node Device automatedly determines the job is complete, paused, or stopped by identifying the last task of the job that has been completed and that the current node job data 236 has stopped processing. If the last task of the job is completed for the total quantity to be completed is finished, then the job is completed. Otherwise, the job has been paused or stopped prior to completion of the entire job. In an embodiment, the Node Device receives a user input indicating the job is complete, paused, or stopped. In an embodiment, the Node Device receives an indication from an automation instruction that the job is complete, paused, or stopped. For example, if the job has three steps and the quantity to be completed is six, the Node Device would identify that the job is completed once step three was completed six times. In an embodiment, the user may manually input an indication of job completion using the user interface of the Node.

At 420, the Node Device communicates the job completion to the operation component and to the ERP system in the form of a job information data update 226. The Node Device will also update the ERP system 202 with inventory status and other status information in the form of ERP inventory updates 224 and job information data updates 226 if not previously updated. In an embodiment, the Node Device updates the ERP system 202 in real time with ERP inventory updates 224 and job information data updates 226 at each step in the job process or as needed. For example, 12 wheels taken from inventory for 4 wagons (ERP system 202 decreases total wheel inventory by 12), 4 wagons in progress at workstation x (ERP system 202 updates job status to "in progress"), wheels attached to 4 wagons at workstation x (ERP system 202 updates wheel attachment task as completed). These are merely examples of updates provided to the ERP system 202 from the Node Device in real-time. This allows for real-time updates to the ERP system 202 and helps to eliminate human error.

In an embodiment when the Node Device determines a job is complete, paused, or stopped, the operation component may receive identification of a next available node jobs 238 to start processing. In this embodiment, the identification of a next available node jobs 238 operates the same as 410 and proceeds through 420. These operations may continue until there are no more available node jobs 238 for processing or the Node Device is turned off.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the foregoing description.

What is claimed is:

1. A node device for integrating and automating a workstation, the node device comprising:

a memory comprising computer readable instructions;

input and output mechanisms operably coupling the node device to an external ERP system and one or more externally connected devices;

an internal storage;

an external case allowing access to the input and out mechanisms and enclosing the memory, internal storage, and a processor; and the processor configured to read the computer readable instructions that when executed causes the node device to:

receive, by the node device, a workstation identification;

identify, by the node device, an ERP system for the workstation;

load an ERP communication driver corresponding to the ERP system identified;

generate, by the node device, automation instructions for the workstation based on a set of external automated devices connected to the node device at the workstation and a set of work data information and a set of inventory location data received by the node device from the ERP system;

identify, by the node device, an available node job to execute by the node device based on a set of available job data received by the node device from the ERP system;

for the available node job identified, receive, by the node device, a set of job information data from the ERP system associated with the available node job;

execute each job information data associated with the available node job identified, including:

provide, by the node device, automation instructions to one or more external automated devices based on the job information data and automation instructions;

provide, by the node device, one or more ERP inventory updates, job information updates, or ERP information updates to the ERP system based on the automation instructions and the job information data;

process, by the node device, input signal data received from the one or more external automated devices based on the automation instructions and input signal data received; and generate, by the node device, the one or more ERP inventory updates, job information updates, or ERP information updates based on the input signal data processed and the automation instructions;

determine, by the node device, that each job information data for the available node job identified has been executed; and report, by the node device, to the ERP system that the available job data associated with the available node job identified is completed.

2. The node device of claim 1, wherein the node device is further caused to generate node work information and node component location data using the ERP communication driver based on the set of work data information and the set of inventory location data received from the ERP system.

3. The node device of claim 1, wherein the node device is further caused to receive an automated device identification for each external automated device in the set of external automated devices connected to the node device.

4. The node device of claim 3, wherein the node device is further caused to generate a node automation identification data using a device communication driver for each automated device identification received.

5. The node device of claim 1, wherein the node device is further caused to store the automation instructions generated on the node device.

6. The node device of claim 1, wherein the node device is further caused to dynamically update the automation instructions based on new node work information, node component location data, or node automation identification data.

7. The node device of claim 1, wherein the node device is further caused to generate an available node job for each available job data from the set of available job data received using the ERP communication driver.

8. A method for automatedly integrating a node device with a workstation and an ERP system, the method comprising:

installing a node device at a workstation;

receiving, by the node device, a workstation identification;

identifying, by the node device, an ERP system for the workstation;

loading an ERP communication driver corresponding to the ERP system identified;

generating, by the node device, automation instructions for the workstation based on a set of external automated devices connected to the node device at the workstation and a set of work data information and inventory location data received by the node device from the ERP system;

identifying, by the node device, an available node job to execute by the node device based on a set of available job data received by the node device from the ERP system;

for the available node job identified, receiving, by the node device, a set of job information data from the ERP system associated with the available node job;

executing each job information data associated with the available node job identified, including:

providing, by the node device, automation instructions to one or more external automated devices based on the job information data and automation instructions;

providing, by the node device, one or more ERP inventory updates, job information updates, or ERP information updates to the ERP system based on the automation instructions and the job information data;

processing, by the node device, input signal data received from the one or more external automated devices based on the automation instructions and input signal data received; and generating, by the node device, the one or more ERP inventory updates, job information updates, or ERP information updates based on the input signal data processed and the automation instructions;

determining, by the node device, that each job information data for the available node job identified has been executed; and reporting, by the node device, to the ERP system that the available job data associated with the available node job identified is completed.

9. The method of claim 8, generating node work information and node component location data using the ERP communication driver based on the set of work data information and the set of inventory location data received from the ERP system.

10. The method of claim 8, receiving an automated device identification for each external automated device in the set of external automated devices connected to the node device.

11. The method of claim 10, generating a node automation identification data using a device communication driver for each automated device identification received.

12. The method of claim 8, storing the automation instructions generated on the node device.

13. The method of claim 8, dynamically updating the automation instructions based on new node work information, node component location data, or node automation identification data.

14. The method of claim 8, wherein the node device is further caused to generate an available node job for each available job data from the set of available job data received using the ERP communication driver.

15. A node device for integrating with external systems and externally connected devices and automating the external systems and the externally connected devices, comprising:

a memory comprising computer readable instructions;

input and output mechanisms operably coupling the node device to an external ERP system and one or more externally connected devices;

an internal storage;

an external case allowing access to the input and out mechanisms and enclosing the memory, internal storage, and a processor; and the processor configured to read the computer readable instructions that when executed causes the node device to:

initialize at a workstation;

receive, by the node device, a workstation identification for the workstation;

identify, by the node device, an ERP system for the workstation;

load an ERP communication driver corresponding to the ERP system identified;

load one or more automation instructions based on the workstation identification into a node device memory;

identify, by the node device, an available node job to execute by the node device, based on a set of available job data received from the ERP system;

receive, by the node device, one or more job information data from the ERP system for the available node job identified;

execute, by the node device, each node job data based on the automation instructions, including:

provide, by the node device, automation instructions to one or more external automated devices operably coupled with the node device based on the automation instructions and the node job data;

provide, by the node device, one or more ERP inventory updates, job information updates, or ERP information updates to the ERP system based on the automation instructions and the node job data;

process, by the node device, input signal data received from the one or more external automated devices based on the automation instructions and input signal data received; and generate, by the node device, the one or more ERP inventory updates, job information updates, or ERP information updates based on the input signal data processed and the automation instructions;

determine, by the node device, that each job information data for the available node job identified is complete; and report, by the node device, to the ERP system that the available job data is completed.

16. The node device of claim 15, wherein the node device is further caused to receive the set of available job data from the ERP system based on the workstation identification.

17. The node device of claim 15, wherein the node device is further caused to generate an available node job for each available job data from the set of available job data received.

18. The node device of claim 15, wherein the node device is further caused to generate a node job data for each job information data received using the ERP communication driver.

19. The node device of claim 15, wherein the node device further includes a display screen and user interface, further wherein the node device is further caused to display through the user interface on the display screen the set of available job data.

20. The node device of claim 19, wherein the node device further includes a user input mechanism, further wherein the node device is further caused to receive a user input through the user input mechanism to select the available node job to be executed by the node device.

* * * * *